US010520715B2

(12) United States Patent
Ben Ezra et al.

(10) Patent No.: US 10,520,715 B2
(45) Date of Patent: Dec. 31, 2019

(54) METHODS AND APPARATUS FOR STRETCHED LIGHT FIELD MICROSCOPE

(71) Applicant: Massachusetts Institute of Technology, Cambridge, MA (US)

(72) Inventors: Moshe Ben Ezra, Jersey City, NJ (US); Edward Boyden, Chestnut Hill, MA (US); Christopher Rowlands, London (GB); Young Gyu Yoon, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/155,874

(22) Filed: Oct. 9, 2018

(65) Prior Publication Data
US 2019/0041624 A1  Feb. 7, 2019

Related U.S. Application Data

(63) Continuation of application No. 14/868,340, filed on Sep. 28, 2015, now Pat. No. 10,120,180.

(60) Provisional application No. 62/056,585, filed on Sep. 28, 2014.

(51) Int. Cl.
*G02B 21/00* (2006.01)
*G02B 21/36* (2006.01)

(52) U.S. Cl.
CPC ....... *G02B 21/361* (2013.01); *G02B 21/0004* (2013.01); *G02B 21/367* (2013.01)

(58) Field of Classification Search
CPC .................. G02B 21/361; G02B 21/0004
USPC ........................................................ 348/79
See application file for complete search history.

(56) References Cited

U.S. PATENT DOCUMENTS

| 7,872,796 B2 | 1/2011 | Georgiev |
| 2005/0094261 A1 | 5/2005 | Hell et al. |
| 2005/0174473 A1 | 8/2005 | Morgan et al. |
| 2008/0180792 A1* | 7/2008 | Georgiev ............. G02B 21/361 359/368 |
| 2011/0228115 A1 | 9/2011 | Ben-Ezra |

OTHER PUBLICATIONS

Adelson, E., et al., Single Lens Stereo with a Plenoptic Camera; published in IEEE Transactions on Pattern Analysis and Machine Intelligence—Special issue on interpretation of 3-D scenes-part II, vol. 14, Issue 2, p. 99-106, IEEE Computer Society Washington, DC, USA, Feb. 1992.

(Continued)

*Primary Examiner* — Jeffery A Williams
(74) *Attorney, Agent, or Firm* — Stephen R. Otis

(57) ABSTRACT

The information budget of a light field microscope is increased by increasing the field of view and image circle diameter of the microscope, while keeping the ratio of overall magnification of the microscope to the numerical aperture of the microscope unchanged. Alternatively, the information budget is increased by increasing the field of view and image circle diameter of the microscope by a first factor, while increasing the ratio of overall magnification of the microscope to the numerical aperture of the microscope by a smaller, second factor. In some cases, an infinity-corrected light field microscope has an overall magnification that is greater than the nominal magnification of the objective lens.

20 Claims, 15 Drawing Sheets

(56) References Cited

OTHER PUBLICATIONS

Ben-Ezra, M., Segmentation with invisible keying signal; published in Proceedings of IEEE Conference on Computer Vision and Pattern Recognition, 2000, vol. 1, pp. 32-37, IEEE, 2000.
Ben-Ezra, M., A Digital Gigapixel Large-Format Tile-Scan Camera; published in IEEE Computer Graphics and Applications, vol. 31, Issue 1, pp. 49-61, IEEE, 2011.
Broxton, M., et al., Wave optics theory and 3-D deconvolution for the light field microscope; published in Optics Express, vol. 21, Issue 21, pp. 25418-25439, OSA Publishing, 2013.
Levoy, M., et al., Light field microscopy; published in ACM Transactions on Graphics (TOG), Proceedings of ACM SIGGRAPH 2006 TOG, vol. 25, Issue 3, pp. 924-934, ACM New York, NY, USA, Jul. 2006.
Levoy, M., Stanford Light Field Microscope Project; 2005-2008, 2013 with last update on Sep. 11, 2014, accessed on May 3, 2015 at http://graphics.stanford.edu/projects/lfmicroscope/.
Prevedel, R., et al., Simultaneous whole-animal 3D imaging of neuronal activity using light-field microscopy; published in Nature Methods 11, 727-730 (2014), published online May 18, 2014.
Schrodel, T., et al., Brain-wide 3D imaging of neuronal activity in Caenorhabditis elegans with sculpted light; published in Nature Methods 10, 1013-1020 (2013), published online Sep. 8, 2013.

\* cited by examiner

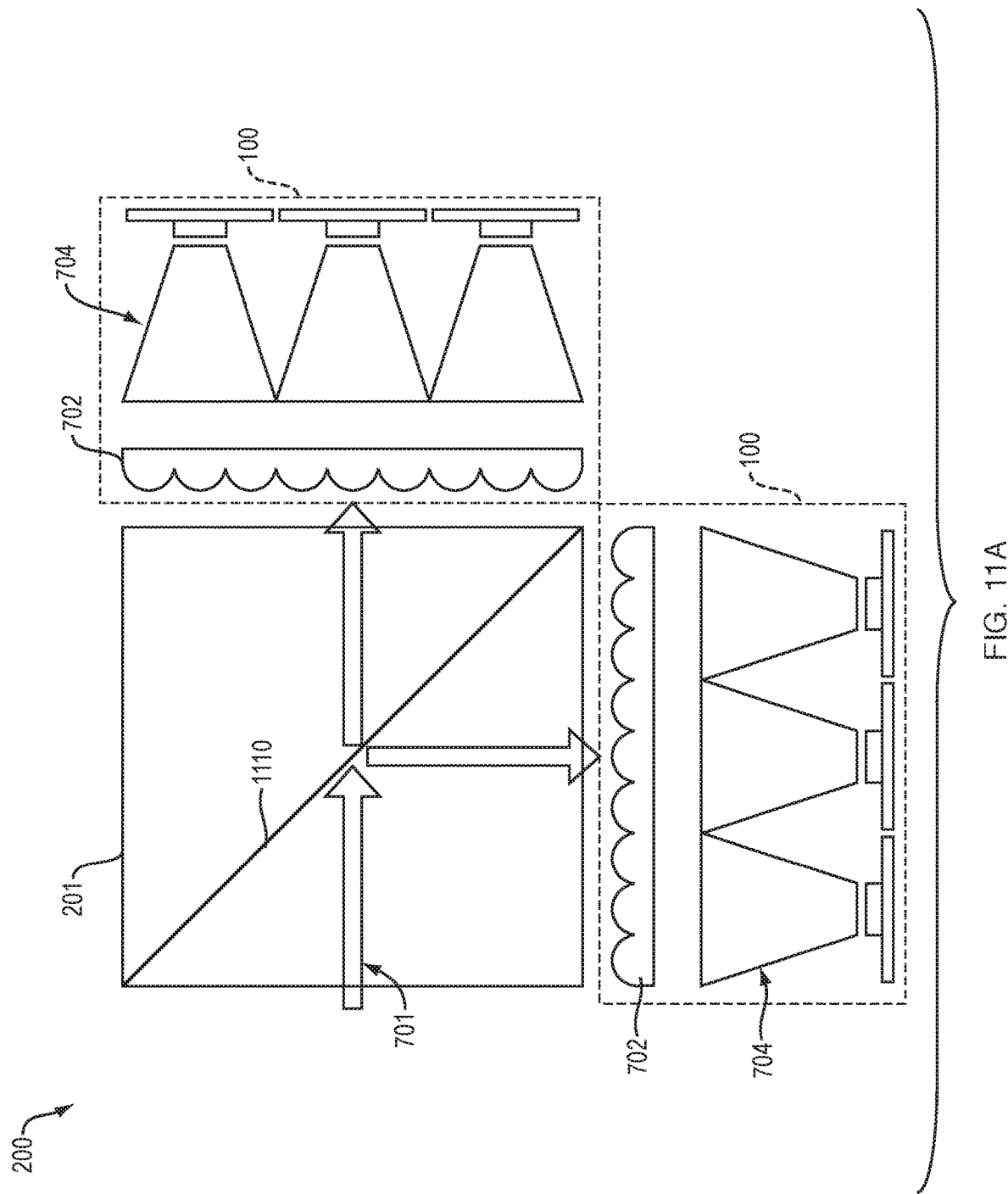

METHODS AND APPARATUS FOR STRETCHED LIGHT FIELD MICROSCOPE

RELATED APPLICATIONS

This application is a continuation of U.S. application Ser. No. 14/868,340 filed on Sep. 28, 2015, which claims the benefit of U.S. Provisional Patent Application No. 62/056,585, filed Sep. 28, 2014 (the "Provisional Application").

FIELD OF TECHNOLOGY

The present invention relates generally to methods and apparatus for increasing the number of diffraction-limited resolvable spots that a light field microscope (LFM) captures.

SUMMARY

The inventors were faced by a problem: How to increase the information budget—that is, the number of diffraction-limited resolvable spots—that a light field microscope (LFM) captures.

In illustrative implementations of this invention, the problem is solved as follows: The information budget of a LFM is increased by increasing the field of view and image circle diameter of the LFM, while keeping the ratio of overall magnification of the LFM to the numerical aperture of the LFM unchanged. Alternatively, the information budget is increased by increasing the field of view and image circle diameter of the LFM by a first factor, while increasing the ratio of overall magnification of the LFM to the numerical aperture of the LFM by a smaller, second factor.

In some implementations, the information budget of the LFM is increased, but the numerical aperture and overall magnification of the LFM are kept unchanged.

Increasing the information budget of the LFM has many practical benefits. For example, in some cases, increasing the information budget of an LFM allows the microscope to examine a larger portion of the specimen in a single image because of a larger field of view (FOV). This is highly advantageous for examining dynamic samples (e.g., neurobiological tissue samples or other biological samples). Also, in some cases, increasing the information budget may increase the axial depth of an image.

In some embodiments of this invention, the LFM comprises an infinite conjugate LFM—that is, an LFM with an infinity-corrected objective.

In some embodiments, the information budget of an infinite conjugate LFM is increased by a method that comprises the following three steps: Step One: Increase the numerical aperture of the LFM by a factor of X, where X is a real number greater than or equal to 1. (Note that X may be 1, if any increase—or further increase—in numerical aperture is not practicable). Step Two: Increase the focal length of the objective by a factor of Y such that the overall magnification of the LFM is reduced in Step Two by a factor of Y, where Y is a real number greater than 1. The first and second steps together increase the information budget of the LFM by $(X*Y)^2$ and together reduce the diffraction-limited resolvable spot size ("spot size") of the LFM by a factor of $X*Y$. Step Three: increase the focal length and diameter of the tube lens by a factor Z, where Z is a real number that is greater than 1 and that is sufficiently large, after giving effect to Steps One, Two and Three, that the resolution of the LFM sensor is not less than the resolution limit of the real image incident on the sensor. (If, before any the three steps are taken, the LFM sensor is at the resolution limit of the real image incident to it, then Z is equal to or greater than $X*Y$. Note that the overall magnification of the LFM is increased by a factor of Z in Step 3, so as to at least partially compensate for the reduction in overall magnification in Step Two.) An overall effect of this three-step method is that information budget is increased by a factor of $(X*Y)^2$. The value Z does not affect the information budget but the ability of the sensor to resolve the real optical image created by the LFM.

In some cases, the three-step method described in the immediately preceding paragraph is supplemented by increasing the diameter of the microscope tube. In these cases: (a) the tube lens forms an image circle at the back focal plane of the tube lens; (b) the third step in the immediately preceding paragraph (increasing the focal length of the tube lens) would, in the absence of any obstruction of light, increase the diameter of the image circle by a factor of Z, resulting in an expanded image circle; (c) for each respective point along a longitudinal axis of the tube, the tube has an internal tube diameter that is equal to the diameter of the tube from inner wall to inner wall of the tube at that respective point; and (d) the method includes a supplemental step. Specifically, the supplemental step comprises increasing the internal tube diameter, at each point along the longitudinal axis by an amount, if any, at least sufficient to cause the tube to not obstruct any light from the objective lens that would otherwise pass through the tube lens and travel to the expanded image circle. However, this supplemental step is not necessary in all cases, because, among other things, the internal tube diameter is initially large enough in some cases that no adjustment to it is needed.

In some embodiments of this invention, to increase the information budget of an infinite conjugate LFM, the LFM is "stretched"—that is, the focal length of the tube lens is increased. Light from each object point exits the objective as a bundle of parallel light rays, but ray bundles from different object points exit the objective in different directions. The increased tube lens focal length causes the ray bundles to spread out more from each other before reaching the tube lens, so that the diameter of the circle of light striking the tube lens increases, and thus the diameter of the image formed by the tube lens increases.

The information budget of the LFM is proportional to the image circle diameter (i.e., in this case, diameter of the real image formed by the tube lens) and is inversely proportional to the resolvable spot size. The resolvable spot size is proportional to the overall magnification of the LFM and inversely proportional to the numerical aperture of the LFM.

Thus, increasing the image circle diameter (by lengthening the tube lens focal length, and increasing the tube lens diameter and image circle diameter) while keeping the overall magnification and numerical aperture of the LFV unchanged, causes the information budget of the LFM to increase.

The overall magnification of an infinite conjugate LFM is equal to the focal length of the tube lens divided by the focal length of the objective.

In some cases, it is desirable to keep the overall magnification of an infinite conjugate LFM unchanged while increasing the information budget. In order to keep the overall magnification unchanged, the focal length of the objective is increased by the same factor as the focal length of the tube lens, diameter of the tube lens, and image circle diameter.

In some cases, it is desirable to adjust the overall magnification or numerical aperture of an infinite conjugate LFM, while increasing the information budget. Increasing the image circle diameter by a first factor and increasing the ratio of the overall magnification of the LFM to the numerical aperture of the LFM by a smaller, second factor increases the information budget, in illustrative embodiments of this invention. For example, in order to increase the information budget and overall magnification while keeping numerical aperture unchanged, two steps are taken in some cases: First, the tube lens' focal length and diameter is increased appropriately to yield a desired increase in image circle diameter. Then the objective lens focal length is adjusted to yield a desired change in magnification, subject to the constraint that the objective lens focal length is increased by some positive amount.

The following three examples help to illustrate the above concepts, regarding an infinite conjugate LFM:

(1) If one starts with an infinite conjugate LFM with an objective that has a nominal magnification of 40× and then doubles the tube lens' focal length and diameter but keeps the numerical aperture of the LFM and the objective lens focal length unchanged, then both the image circle diameter and the overall magnification will double, but the information budget will not change. This is because the resolvable spot size will also double.

(2) If one starts with an infinite conjugate LFM with an objective that has a nominal magnification of 40× and then doubles the tube lens' focal length and diameter, reduces the nominal magnification of the objective to 20× (i.e., doubles the focal length of the objective) and keeps numerical aperture unchanged, then (i) the overall magnification will be unchanged, (ii) the image circle diameter will double, and (iii) the information budget will quadruple.

(3) If one starts with an infinite conjugate LFM with an objective that has a nominal magnification of 40×, and then doubles the tube lens' focal length and diameter, reduces the nominal magnification of the objective to 30× (i.e., increases the focal length of the objective by a factor of 1.333) and keeps the numerical aperture unchanged, then (i) the overall magnification will increase by a factor of 1.333, (ii) the image circle diameter will increase by a factor of 1.333, and (iii) the information budget will increase by a factor of 1.778 (that is, $1.333^2$).

In some cases, in order to increase the information budget of an infinite conjugate LFM, four changes are made: (1) the focal length of the objective lens is increased by a factor of K (thereby decreasing the nominal magnification of the objective lens by a factor of K); (2) the focal length of the tube lens is increased by a factor of K; (3) the tube lens' diameter is increased by a factor of K; and (4) as a result of increasing the tube lens focal length by a factor of K, the distance of the tube lens from the telecentric stop is increased by a factor of K and the distance of the tube lens from the image plane is increased by a factor of K as well. As used herein, K is a variable that is a positive real number. These changes: (a) cause the field of view (FOV) of the LFM to increase by a factor of K; and (b) cause the image circle diameter $D_{img}$ to increase by a factor of K and the information budget to increase by a factor of $K^2$. These changes may be made without altering the numerical aperture (NA) of the LFM (e.g., if the objective with lower nominal magnification has the same NA as the objective with higher nominal magnification). Furthermore, these changes do not alter the overall magnification of the infinite conjugate LFM, which is equal to the focal length of the tube lens divided by the focal length of the objective lens. Because the focal length of the tube lens is increased by a factor of K and the focal length of the objective is also increased by a factor of K, the overall magnification of the infinite conjugate LFM does not change. If NA is kept unchanged, then the overall effect of the modification is to increase the information budget by a factor of $K^2$ and to keep the overall magnification of the LFM unchanged.

In some embodiments of this invention, the LFM comprises a finite conjugate LFM—that is, an LFM with a finite conjugate objective.

To increase the information budget of the finite conjugate LFM, the LFM is "stretched" by adding a second magnification stage in the optical path—that is, by inserting a reimaging lens in the optical path after the intermediate image formed by the objective. The reimaging lens reimages and magnifies the intermediate image that is formed by the objective. The diameter of the real image formed by the reimaging lens is larger than the diameter of the intermediate image formed by the objective.

The information budget of the finite conjugate LFM is proportional to the image circle diameter (i.e., in this case, the diameter of the real image formed by the reimaging lens) and is inversely proportional to the resolvable spot size. The resolvable spot size is proportional to the overall magnification of the LFM and inversely proportional to the numerical aperture. Thus, increasing the image circle diameter (due to magnification by the reimaging lens) without changing the overall magnification of the LFM and without changing the numerical aperture of the LFM increases the information budget of the LFM.

The overall magnification of the finite conjugate LFM depends, in part, on where the reimaging lens is placed relative to (i) the intermediate image plane and (ii) the image plane at the lenslet array. According to a thin lens model, the magnification created by the relay lens is equal to a first optical distance divided by a second optical distance, where: (a) the first optical distance is between the relay lens and the lenslet array; and (b) the second optical distance is between the relay lens and the intermediate image plane.

In some cases, it is desirable to keep the overall magnification of a finite conjugate LFM unchanged while increasing the information budget. In order to keep the overall magnification unchanged, the magnification of the objective is decreased by the same factor as the magnification created by the reimaging lens. For example, if the reimaging lens alone produces a magnification of 3×, then the magnification of the objective is decreased by a factor of 3, in order to compensate. The magnification of the objective is adjusted by adjusting the focal length of the objective. For example, to decrease the magnification of the objective by a factor of 3, the focal length of the objective is increased by a factor of 3.

In other cases, it is desirable to adjust the overall magnification or numerical aperture of a finite conjugate LFM, while increasing the information budget. Increasing the image circle diameter by a first factor and increasing the overall magnification by a smaller, second factor increases the information budget. Thus, in order to adjust the overall magnification of a finite conjugate LFM, while also increasing the information budget, two steps are taken: First, the LFM is stretched by adding a second magnification stage, in which the reimaging lens is positioned appropriately to yield a desired magnification and desired increase in image circle diameter. Then the magnification of the objective is decreased in order to yield a desired change in overall magnification of the LFM, subject to the constraint that the magnification of the objective lens is decreased by some amount.

The following three examples help to illustrate the above concepts, regarding a finite conjugate LFM:

(1) If one starts with a finite conjugate LFM with an objective that has a nominal magnification of 40× and then (while keeping the objective focal length and numerical aperture unchanged) adds a magnification stage in which the reimaging lens is positioned at 1.5 times its focal length from the intermediate image and at 3 times its focal length from the lenslet array, then, according to a thins lens formulation: (i) the overall magnification of the LFM will double, (ii) the image circle diameter will double, and (iii) the information budget will remain unchanged.

(2) If one starts with a finite conjugate LFM with an objective that has a nominal magnification of 40× and then, without changing the numerical aperture of the LFM, both (a) reduces the nominal magnification of the objective to 20× (i.e., doubles the focal length of the objective), and (b) adds a magnification stage in which the reimaging lens is positioned at 1.5 times its focal length from the intermediate image and at 3 times its focal length from the lenslet array, then: (i) (in a thin lens model) the overall magnification will be unchanged, (ii) the image circle diameter will double, and (iii) the information budget will quadruple.

(3) If one starts with a finite conjugate LFM with an objective that has a nominal magnification of 40× and then, without changing the numerical aperture of the LFM, both (a) reduces the nominal magnification of the objective to 30× (i.e., increases the focal length of the objective by a factor of 1.333), and (b) adds a magnification stage in which the reimaging lens is positioned at 1.5 times its focal length from the intermediate image and at 3 times its focal length from the lenslet array, then (i) (in a thin lens model) the overall magnification will increase by a factor of 1.333, (ii) the image circle diameter will increase by a factor of 2, and (iii) the information budget will increase by a factor of 1.778 (that is, $1.333^2$).

In some cases, in order to increase the information budget (without changing numerical aperture or overall magnification) of a finite conjugate LFM, two changes are made: (1) the focal length of the objective lens is increased by a factor of K (thereby decreasing the magnification of the objective lens by a factor of K); (2) a reimaging lens (i.e., magnifying relay lens) is inserted in the optical path after an intermediate image plane and before a lenslet array. These changes: (a) cause the field of view of the LFM to increase by a factor of K; and (b) cause the image circle diameter $D_{img}$ to increase by a factor of K and the information budget to increase by a factor of $K^2$. These changes may be made without altering the numerical aperture (NA) of the LFM (e.g., if the objective with lower nominal magnification has the same NA as the objective with higher nominal magnification). Furthermore, these changes do not alter the overall magnification. The reimaging lens is positioned such that the magnification created by the reimaging lens is equal to K. For example, in a thin lens model, the magnification created by the relay lens is equal to a first optical distance divided by a second optical distance, where: (a) the first optical distance is between the relay lens and the new position of the lenslet array (the lenslet array being farther from the objective than before the changes); and (b) the second optical distance is between the relay lens and the intermediate image plane (which is positioned where the lenslet array was located before the changes). The decrease in magnification of the objective lens is compensated for by the increase in magnification due to the relay magnifying lens, so there is no change in overall magnification. If NA is kept unchanged, the overall effect of the modification is to increase the information budget by a factor of $K^2$ and to keep the overall magnification of the LFM unchanged.

In some implementations of this invention, the overall magnification of the LFM does not change. However, in other implementations of this invention, the overall magnification does change. Thus, in some embodiments, the field of view, image circle diameter and information budget of the LFM increase, and the overall magnification also changes. For example, a change in magnification may occur for an infinite conjugate LFM, if the focal length of the tube lens and the focal length of the objective lens are scaled by different amounts. Likewise, a change in magnification may occur for a finite conjugate LFM, if the reimaging lens does not compensate exactly for the decrease in the magnification of the objective lens.

In some implementations, the diameter of at least a portion of the microscope tube is increased to order to make room for the increased circle size diameter. For example, in some cases with a finite conjugate objective, the diameter of the microscope tube is increased in a region of the tube that is after the intermediate image formed by the objective. In some cases with an infinity-corrected objective, the diameter of the entire microscope tube is increased. In some cases, with either an infinite conjugate LFM or finite conjugate LFM, some regions of the microscope tube may be portions of cones.

In some embodiments of this invention, the field of view, image circle diameter and information budget of the LFM increase, and one or more of the following also changes: overall magnification of the LFM, numerical aperture of the LFM, and diffraction-limited resolvable spot size.

An advantage of the present invention is that it may easily be fabricated with a standard, off-the-shelf objective lens.

In some embodiments of this invention: (a) the LFM is an infinite conjugate LFM; (b) the tube lens focal length is longer than the 200 mm; and (c) the magnification at the image plane is greater than the nominal magnification of the objective lens.

In some embodiments of this invention: (a) the LFM is a finite conjugate LFM; and (b) a magnifying lens is interposed between the objective lens and the image plane, causing the magnification at the image plane to be greater than the magnification produced by the objective lens.

In illustrative implementations of this invention, the LFM includes multiple lenslet arrays.

In some cases, a higher lenslet packing density improves the utilization of the information budget of the LFM (i.e., the number of diffraction-limited resolvable spots captured by the LFM).

In some cases, the lenslet packing density is increased by changing the packing configuration within a single lenslet array. For example, in some cases, lenslets are packed in a hexagonal pattern rather than a rectangular pattern, because the former has a higher packing density than the latter.

In some cases, staggered lenslet arrays are used to increase the effective lenslet packing density. The staggered arrays create overlap regions in an image.

In some cases, the staggering (overlapping) of lenslet arrays is achieved by effectively, but not actually, placing lenslet arrays in series. For example, in some cases, beamsplitters and a mirror are positioned in series in an optical path of the LFM, at different optical distances from the objective of the LFM. Each of these beamsplitters and mirror, respectively, steers light through a lenslet array to a separate image sensor. Images captured by the image sensors are then combined, Alternatively, in some cases, the staggering (overlapping) of lenslet arrays is achieved by lenslet arrays that are all at the same optical distance from the objective. For example, in some cases: (a) beamsplitters and a mirror direct light to multiple lenslet arrays that are each the same optical distance from the objective lens; (b) a separate image sensor is used for each lenslet array, such that each image sensor, respectively, images one of the lenslet arrays; (c) the lenslet arrays are positioned at different lateral positions relative to the imaging planes (that is, the distance that the lenslet arrays are laterally shifted, relative to their respective imaging sensors, varies from one array to another array); and (d) when images captured by the image sensors are combined in post-processing, the effect is similar to what would occur if all of the lenslet arrays were in front of a single image sensor and were staggered (laterally shifted) relative to each other.

In illustrative implementations, the staggering of lenslet arrays increases effective packing density and thus improves utilization of the information captured by the LFM. For example, in some cases, the staggering of lenslet arrays improves sampling of data and lateral and axial resolution of the LFM.

The description of the present invention in the Summary and Abstract sections hereof is just a summary. It is intended only to give a general introduction to some illustrative implementations of this invention. It does not describe all of the details and variations of this invention. Likewise, the descriptions of this invention in the Field of Technology section and Field Of Endeavor section are not limiting; instead they each identify, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIG. 11A shows two light field imagers at the same optical distance from the objective lens.

In FIG. 12, the scanning movement is in a straight line. In FIG. 13, the scanning movement is zig-zag.

Figure 1:
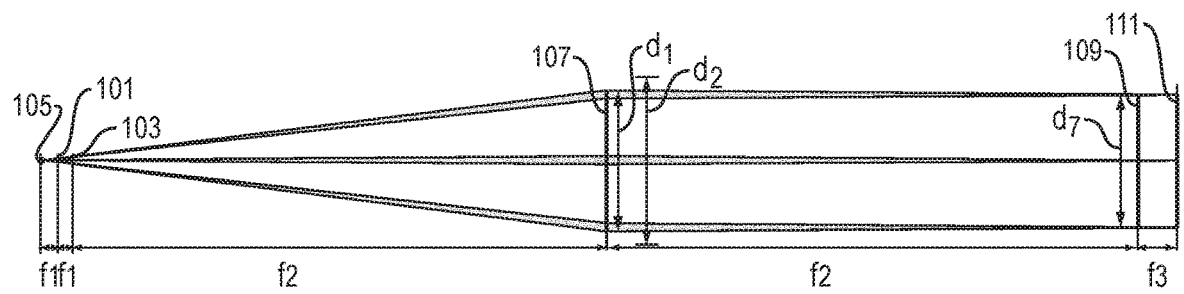
FIG. 1 shows an infinite conjugate light field microscope (LFM).

The above Figures show some illustrative implementations of this invention, or provide information that relates to those implementations. However, this invention may be implemented in many other ways.

DETAILED DESCRIPTION

The information budget or total available information content from a light field microscope (LFM) is limited by the number of resolvable spots, which in turn is limited by diffraction.

Recent super-resolution and deconvolution techniques better utilize the existing information by exploiting aliasing through multiple views and the known point spread function (PSF). While super-resolution and deconvolution better utilize the available information budget, these approaches do not increase the total information.

The information budget for a LFM is a function of wave length, numerical aperture, magnification and field of view (FOV). This is true for an ordinary (non-light field) microscope also.

For a LFM, there is also a tradeoff between angular and special resolution of the LFM microscope. For a LFM, the tradeoffs for a given fixed information budget are as follows. One can: (i) reduce lenslet size to increase the spatial resolution at the expense of angular resolution; (ii) increase lenslet size to increase the angular resolution at the expense of spatial resolution. (iii) increase magnification to increase both angular and spatial resolution at the expense of FOV, or (iv) reduce magnification to increase FOV at the expense of both angular and spatial resolution.

In illustrative implementations, for a given NA, magnification and wavelength of a LFM, the information budget is increased by increasing the FOV of the LFM.

The diffraction limited resolvable spot size, $R_{spt}$, of an LFM with a given objective is:

$$R_{spt} = \frac{c\lambda}{NA} M \quad \text{(Equation 1)}$$

where c is a constant defining the criterion used (c=0.61 for Rayleigh criterion; c=0.47 for Sparrow criterion), $\lambda$ is the wavelength of light, NA is the numerical aperture of the objective and M is the overall magnification of the LFM.

The densest possible lenslet packing for a circularly resolvable spot is achieved through hexagonal packing, which, has a packing density, $\eta_h$, of $\eta_h = 1/6\pi\sqrt{3} \approx 0.9069$. Thus, an upper limit of the number of diffraction-limited resolvable spots or "the information budget", i, for an image circle diameter $D_{img}$ and resolvable spot size $R_{spt}$, is given by:

$$i = \eta_h \frac{\pi(0.5 D_{img})^2}{\pi(0.5 R_{spt})^2} = \eta_h \frac{(D_{img})^2}{(R_{spt})^2} \quad \text{(Equation 2)}$$

For example: Given an image circle diameter equal to a standard 23 mm microscope tube diameter, a 40× magnification, 0.95 NA objective, green light (535 nm), and applying the Sparrow resolution criterion with hexagonal packing, the information budget is 4,279,952 resolvable spots, roughly the size of a 2068×2068 sensor.

In some cases, a lenslet array with a matched numerical aperture is used to redistribute the existing information in order to obtain multiple views from multiple sub-apertures. For example, a 125 µm lenslet array pitch, with the resolvable spot size of $R_{spt}$=10.58 for the above mentioned parameters, will provide 99 different angular views (with resolvable spots arranged in a hexagonal lattice). The lenslet array does not change the resolvable spot size $R_{spt}$.

Equation 2 demonstrates that, with a fixed packing density, increasing the information budget is achievable by either reducing $R_{spt}$ or by increasing $D_{img}$. Reducing $R_{spt}$ is physically achievable by increasing the numerical aperture of the objective, or by reducing the optical magnification. For a given application, however, the numerical aperture and overall magnification may be specified. Thus, it is advantageous to increase $D_{img}$ in order to increase the information budget, even when numerical aperture and overall magnification remain unchanged.

In some embodiments of this invention, the image circle diameter $D_{img}$ of an LFM and the FOV are increased, but the numerical aperture, overall magnification, and diffraction-limited resolvable spot size of the LFM are unchanged.

In many implementations of this invention, a standard off-the-shelf objective lens is used, simplifying the creation and replication of the stretched light field microscope.

Infinite Conjugate LFM

FIG. 1 shows an infinite conjugate light field microscope (LFM), in an illustrative implementation of this invention.

In FIG. 1, an infinite conjugate LFM includes an infinity-corrected objective lens 101, a telecentric stop 103, a tube lens 107, a lenslet array 109 and a set of one or more image sensors 111. The object being imaged 105 and the telecentric stop 103 are located at the front focal plane and back focal plane, respectively, of the objective 101. The telecentric stop 103 and lenslet array 109 are located at the front focal plane and back focal plane, respectively, of the tube lens 107. Thus, the telecentric stop 103 is positioned so that it coincides with both the back focal plane of the objective and the front focal plane of the tube lens. This causes the projection at the image plane to be telecentric. The tube lens 107 focuses a real image onto the lenslet array 109.

In FIG. 1, the lenslet array 109 forms imagelets on an image sensor 111. Each imagelet is a "set of views" for a given lenslet in the lenslet array. In some cases, the image sensors 111 are located at an optical distance from the lenslet array 109 that is equal to the focal length of the lenslet array 109. The LFM is double telecentric (i.e., its entrance and exit pupils are at optical infinity).

In FIG. 1, f1 is the focal length of the objective 101; f2 is the focal length of the tube lens 107, f3 is the focal length of lenslet array 109, d1 is the diameter (perpendicular to the optical axis) of tube lens 107, and d2 is the tube diameter of the LFM. Typically, tube diameter d2 is slightly larger than tube lens diameter d1.

In conventional infinity-corrected LFMs, the objective lens is designed to work with a tube lens that has a focal length that is 200 mm or less.

In contrast, in the example of this invention shown in FIG. 1: (a) the focal length f2 of the tube lens 107 is greater than 200 mm. For example, in some cases, the focal length f2 of tube lens 107 shown in FIG. 1 is at least 225 mm, or at least 250 mm, or at least 275 mm, or at least 300 mm, or at least 325 mm, or at least 350 mm, or at least 375 mm, or at least 400 mm, or at least 425 mm, or at least 450 mm, or at least 475 mm, or at least 500 mm, or at least 550 mm, or at least 600 mm, or at least 1000 mm.

In illustrative implementations, the infinite conjugate LFM is telecentric at both ends. The fact that the LFM is double telecentric (both the entrance and exit pupils of the LFM are at optical infinity) is advantageous for light field imaging with a lenslet array. This is because the lenslet array is usually designed for light that strikes the array at an angle very close to perpendicular to the center plane of lenslet array.

As used herein, "lens" means a single lens or compound lens. In many implementations, an infinity-corrected objective and a tube lens are each a compound lens. Similarly, in many other embodiments, a finite conjugate objective and a magnifying relay lens are each a compound lens.

Figure 2:
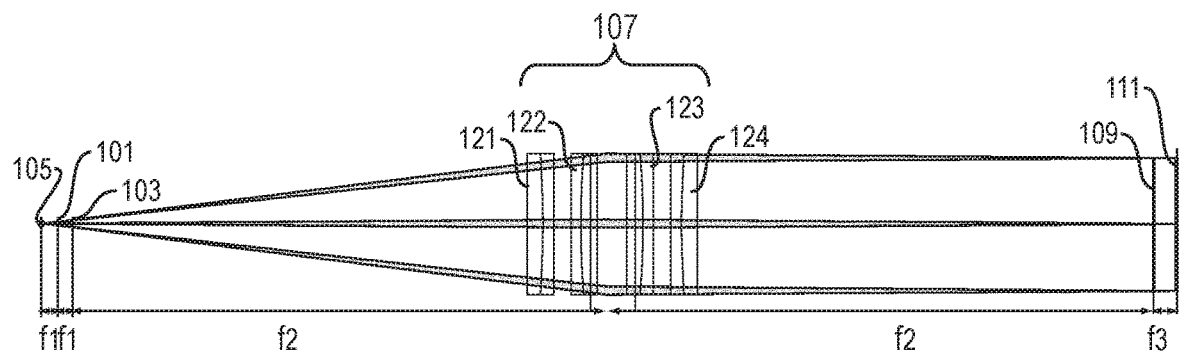
FIG. 2 shows an example of an infinite conjugate LFM, in which a compound tube lens comprises four doublets.

FIG. 2 shows an example of an infinite conjugate LFM, in an illustrative embodiment of this invention. In FIG. 2, a compound tube lens 107 comprises four achromatic doublets 121, 122, 123, 124.

In FIGS. 1 and 2, an infinity-corrected light field microscope has an overall magnification that is greater than the nominal magnification of the objective lens.

In some embodiments, an infinite conjugate microscope does not include any magnifying optical element other than the tube lens and the objective lens.

In some embodiments, an infinite conjugate LFM (such as the LFM shown in FIG. 1 or 2) has an information budget that is greater by a factor of $K^2$ than a modified information budget. The modified information budget is the information budget that the LFM would have if the LFM were modified by reducing the focal length of the objective lens and the focal length and diameter of the tube lens by a factor of K without changing the numerical aperture and overall magnification of the LFM.

In some alternative embodiments, an infinite conjugate LFM (such as the LFM shown in FIG. 1 or 2) has an information budget that is greater by a factor of $K^2$ than the information budget that the microscope would have if the microscope were modified (i) by reducing the focal length and diameter of the tube lens by a factor of K and (ii) by increasing the ratio of the nominal magnification of the objective lens to the numerical aperture of the objective lens by a factor of K.

Finite Conjugate LFM

In some embodiments of this invention, a finite conjugate LFM is employed.

Figure 3:
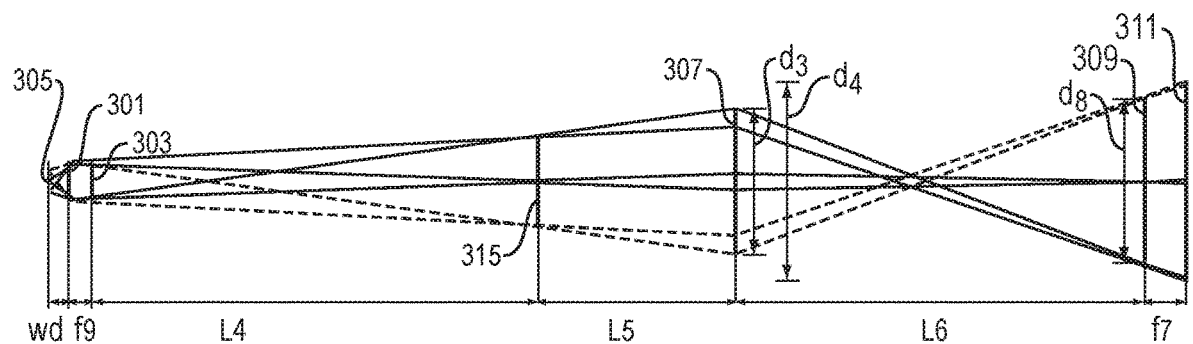
FIG. 3 shows a finite conjugate LFM.

In FIG. 3, a finite conjugate LFM includes a finite conjugate objective lens 301, telecentric stop 303, magnifying relay lens 307, lenslet array 309 and a set of one or more image sensors 311. The LFM in FIG. 3 is telecentric in one direction, because stop 303 is positioned is at the back focal plane of the objective. The object being imaged 305 is located at a working distance wd from the objective 301. The relay lens 107 reimages light from the intermediate image 315 and focuses a circular image (which is a real image) onto the lenslet array 109. This circular image has a diameter d8. In some cases, the relay lens is telecentric on its image side (but not on both sides).

The diameter $D_{img}$ of the image circle is d7 in FIG. 1 and is d8 in FIG. 3.

In FIG. 3, the lenslet array 309 refracts or diffracts light, to form circular imagelets on a set of one or more image sensors 311. In many cases, the image sensors 311 are located at an optical distance from the lenslet array 309 that is equal to the focal length of the lenslet array 309.

In FIG. 3: f9 is the distance between the telecentric stop 303 and the objective 301; L4 is the distance between the stop 1303 and the intermediate image plane 315; L5 is the distance between the intermediate image plane 315 and the magnifying relaying lens 307; L6 is the distance between the magnifying relay lens 307 and the lenslet array 309; f7 is the focal length of lenslet array 309; d3 is the diameter (perpendicular to the optical axis) of relay lens 307; and d4 is the tube diameter of the LFM. Typically, tube diameter d4 is slightly larger than relay lens diameter d3.

In FIG. 3, a finite conjugate light field microscope has an overall magnification that is greater than the magnification of the objective lens.

In some alternative embodiments, a finite conjugate LFM (such as the LFM shown in FIG. 3) has an information budget that is greater by a factor of $K^2$ than the information budget that the microscope would have if the microscope were modified (i) removing the reimaging lens to reduce the overall magnification of the microscope by a factor of K and (ii) by increasing the ratio of the magnification of the objective lens to the numerical aperture of the objective lens by a factor of K.

Lenslet Overlaps

In some embodiments, image sensors are effectively positioned in series in an optical path, by use of beamsplitters and mirrors.

Figure 4:
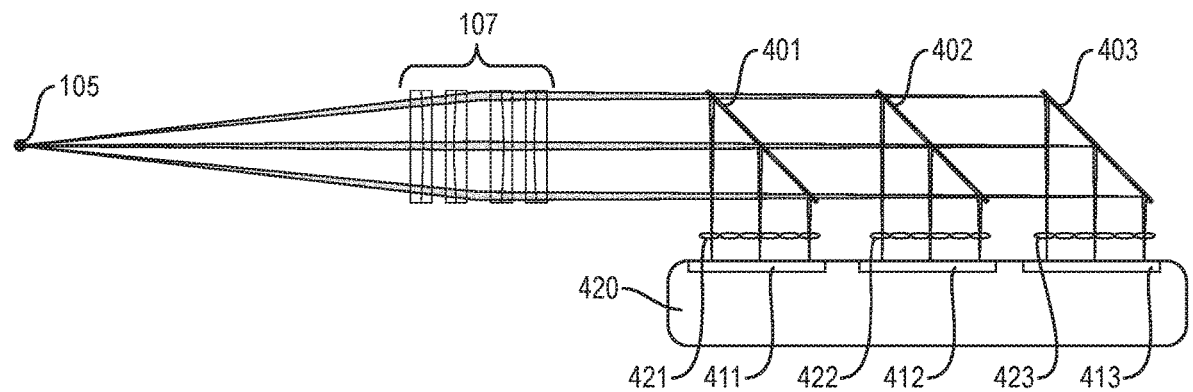
FIG. 4 shows an example of an LFM, in which image sensors are effectively positioned in series, such that they capture light at different optical distances from the objective lens.

FIG. 4 shows an example of an LFM, in which image sensors are effectively positioned in series, such that they capture light at different optical distances from the objective lens, in an illustrative implementation of this invention. In FIG. 4, beamsplitter 401, beamsplitter 402 and mirror 403 are arranged in series, such that some light from the tube lens 107 travels first through beamsplitter 401, then through beamsplitter 402, and then strikes mirror 403. In addition, beamsplitter 401, beamsplitter 402 and mirror 403 each reflect light, such that (a) beamsplitter 401 reflects part of the light from the tube lens to image sensor 411 via lenslet array 421, (b) beamsplitter 402 reflects part of the light from the tube lens to image sensor 412 via lenslet array 422, and (c) mirror 403 reflects part of the light from the tube lens to image sensor 413 via lenslet array 423. Image sensors 411, 412, 413 are housed in camera 420.

Each lens of a lenslet array captures slightly different angular information, enabling computational reconstruction of 3-D images from single camera shots for a given sensor. Effectively positioning lenslet arrays (and their respective image sensors) in series, such as in the example shown in FIG. 4, has at least two advantages: it (a) increases axial depth acquisition because each have different object-side focal plane, and (b) increases resolution by shifting one lenslet array with respect to the other (staggering). This series approach is advantageous in overcoming the low resolution "singularity" obtained at each lenslet array a specific focal plane, as long as the axial depth of the lenslet arrays overlap. Syncing numerous lenslet/camera pairs increases the sampling rate of the LFM. At least partial redundancy of depth measurement is achieved when lenslets axial depth overlap. As light passes through a series of beamsplitters, the amount of illumination decreases. In some cases, to mitigate this reduction of light intensity, light amplifiers are included in the later optical paths.

In illustrative implementations of this invention, each lenslet array comprises an array of microlenses.

In some cases, the utilization of the existing information budget of the LFM (i.e., the number of diffraction-limited resolvable spots captured by the LFM) is improved by increasing the lenslet packing density.

Figure 5:
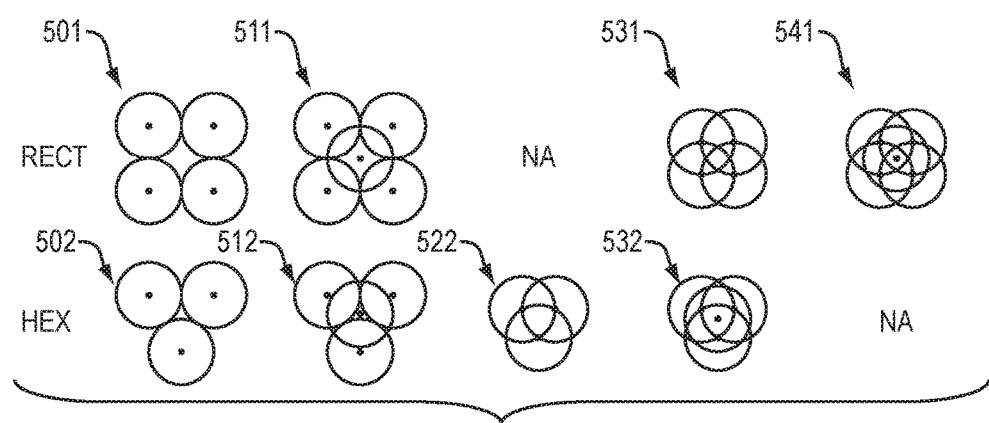
FIG. 5 shows examples of lenslet packing and of imagelet overlaps due to staggered lenslet arrays.

FIG. 5 shows examples of lenslet packing and of imagelet overlaps due to staggered lenslet arrays, in an illustrative implementation of this invention. In FIG. 5: (a) the top row shows rectangular packing of lenslets; (b) the bottom row shows hexagonal packing of lenslets; (c) the first column shows examples in which there is a single lenslet array and no overlap of lenslets; and (d) the second, third, fourth and fifth columns show examples in which overlap regions where images formed by lenslet arrays overlap. For purposes of this description of FIG. 5, columns are numbered from left to right, so that the leftmost column is column 1 and the rightmost column in column 5. Specifically, FIG. 5 shows: (a) rectangular lenslet packing with no overlap 501; (b) hexagonal lenslet packing with no overlap 502; (c) rectangular lenslet packing, in which images formed by two lenslet arrays overlap 511; (d) hexagonal lenslet packing, in which images formed by two lenslet arrays overlap 512; (e) hexagonal lenslet packing, in which images formed by three lenslet arrays overlap 522; (c) rectangular lenslet packing, in which images formed by four lenslet arrays overlap 531; (d) hexagonal lenslet packing, in which images formed by four lenslet arrays overlap 532; and (e) rectangular lenslet packing, in which images formed by five lenslet arrays overlap 541.

In FIG. 5, each lenslet creates an imagelet at the image plane. Thus, overlapping lenslets create overlapping imagelets. The greater the overlap (i.e., the greater the number of imagelets that overlap in a given overlap region), the greater the sampling density. The packing density may be expressed in terms of the pitch (distance) between the centers of the imagelets created by the lenslets. The pitch, in turn, may be expressed in terms of r (the radius of the imagelet) or d (the diameter of the imagelet).

In FIG. 5, the centers of the imagelets are marked by dots, to make it easier to see the distances between the centers. However, these dots typically do not exist in the actual imagelets.

The following is a list of packing densities, for the lenslet packing examples shown in FIG. 5: (a) for lenslet packing 501, the shortest distance between the centers of the imagelets is d and the longest distance between the centers of the imagelets is d√2; (b) for lenslet packing 502, the shortest and longest distance between the centers of the imagelets is d; (c) for lenslet packing 511, the shortest distance between the centers of the imagelets is $$d\frac{\sqrt{2}}{2}$$

and the longest distance between the centers of the imagelets is d; (d) for lenslet packing 512, the shortest distance between the centers of the imagelets is $$d\frac{\sqrt{3}}{3}$$

and the longest distance between the centers of the imagelets is d; (e) for lenslet packing 522, the shortest and longest distances between the centers of the imagelets are equal to r; (f) for lenslet packing 531, the shortest distance between the centers of the imagelets is r and the longest distance between the centers of the imagelets is $r\sqrt{2}$; (g) for lenslet packing 532, the shortest distance between the centers of the imagelets is $$r\frac{\sqrt{3}}{3}$$

and the longest distance between the centers of the imagelets is r; and (h) for lenslet packing 541, the shortest distance between the centers of the imagelets is $$r\frac{\sqrt{2}}{2},$$

and the longest distance between the centers of the imagelets is r.

Imaging Configurations

Figure 6:
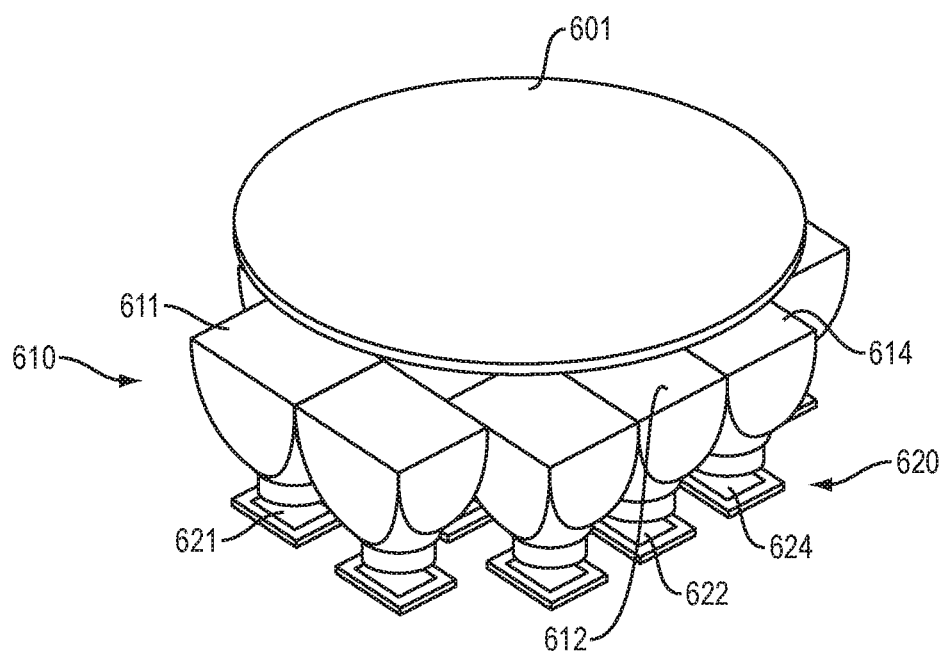
FIG. 6 shows a light field imager, including a lenslet array, set of fiber optic tapers, and image sensors.

In some cases, fiber optic tapers are used to steer light from lenslet array(s) to image sensors. FIG. 6 shows a light field imager, including a lenslet array, set of fiber optic tapers, and image sensors, in an illustrative implementation of this invention. In the example shown in FIG. 6, light passes through a lenslet array 601, then passes through a set of fiber optic tapers 610 and then strikes a set of image sensors 620. Each fiber optic taper, respectively, steers light to a single image sensor. For example, tapers 611, 612 and 614 steer light to image sensors 621, 622 and 624, respectively.

Figure 7:
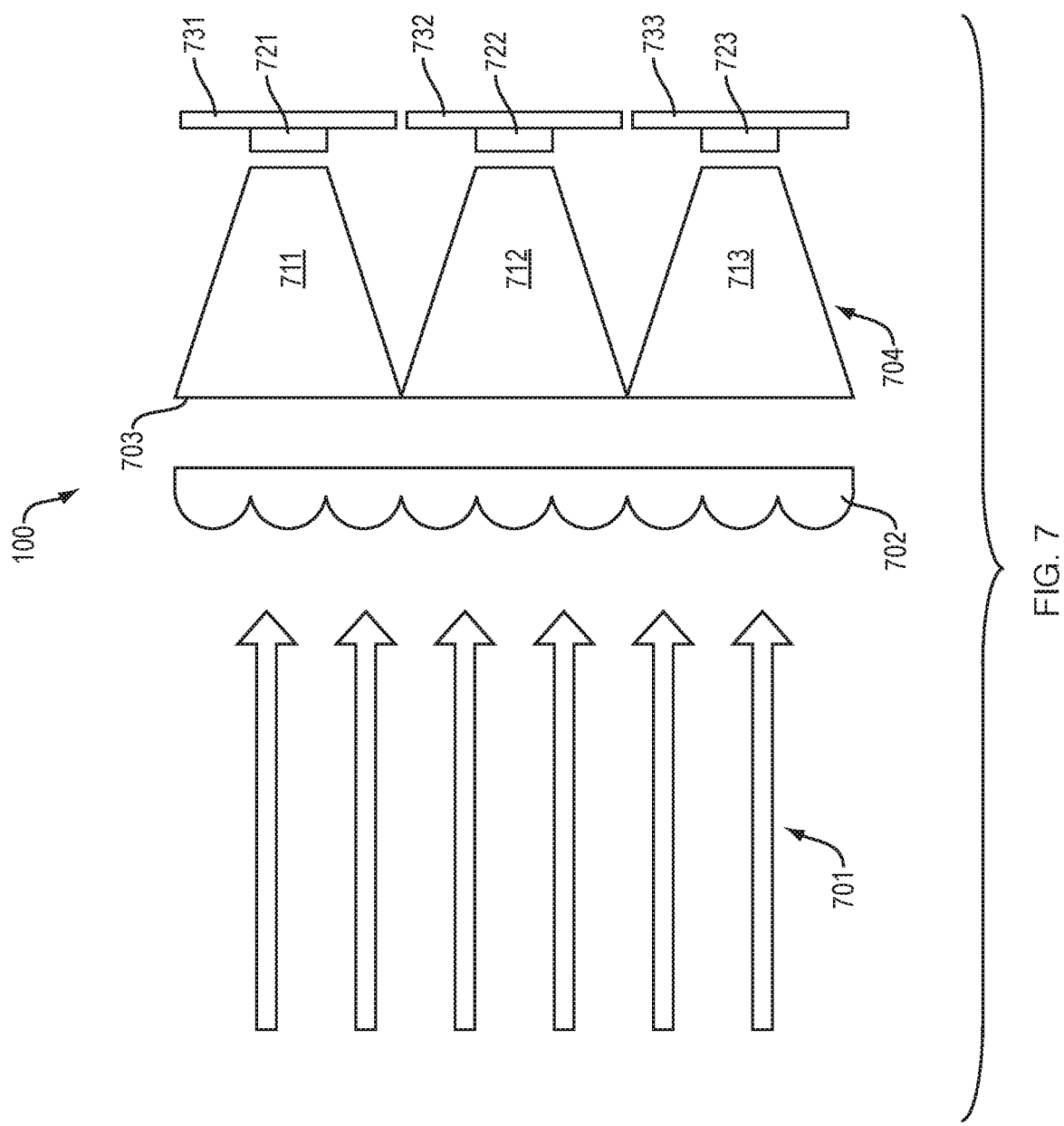
FIG. 7 shows another example of a light field imager.

FIG. 7 shows another example of a light field imager, in an illustrative implementation of this invention. In FIG. 7, a light 701 strikes lenslet array 702. Light that exits the lenslet array 702 forms a light-field image on the wide face 703 of a fiber optic taper array 704. Each fiber optic taper in taper array 704 steers light to a single image sensor. For example, tapers 711, 712 and 713 steer light to image sensors 721, 722 and 723, respectively. Image sensors 721, 722 and 723 are part of cameras 731, 732 and 733, respectively. Light field imager 100 comprises a lenslet array 702, fiber optic taper array 704 and multiple cameras 731, 732, 733.

Figure 8:
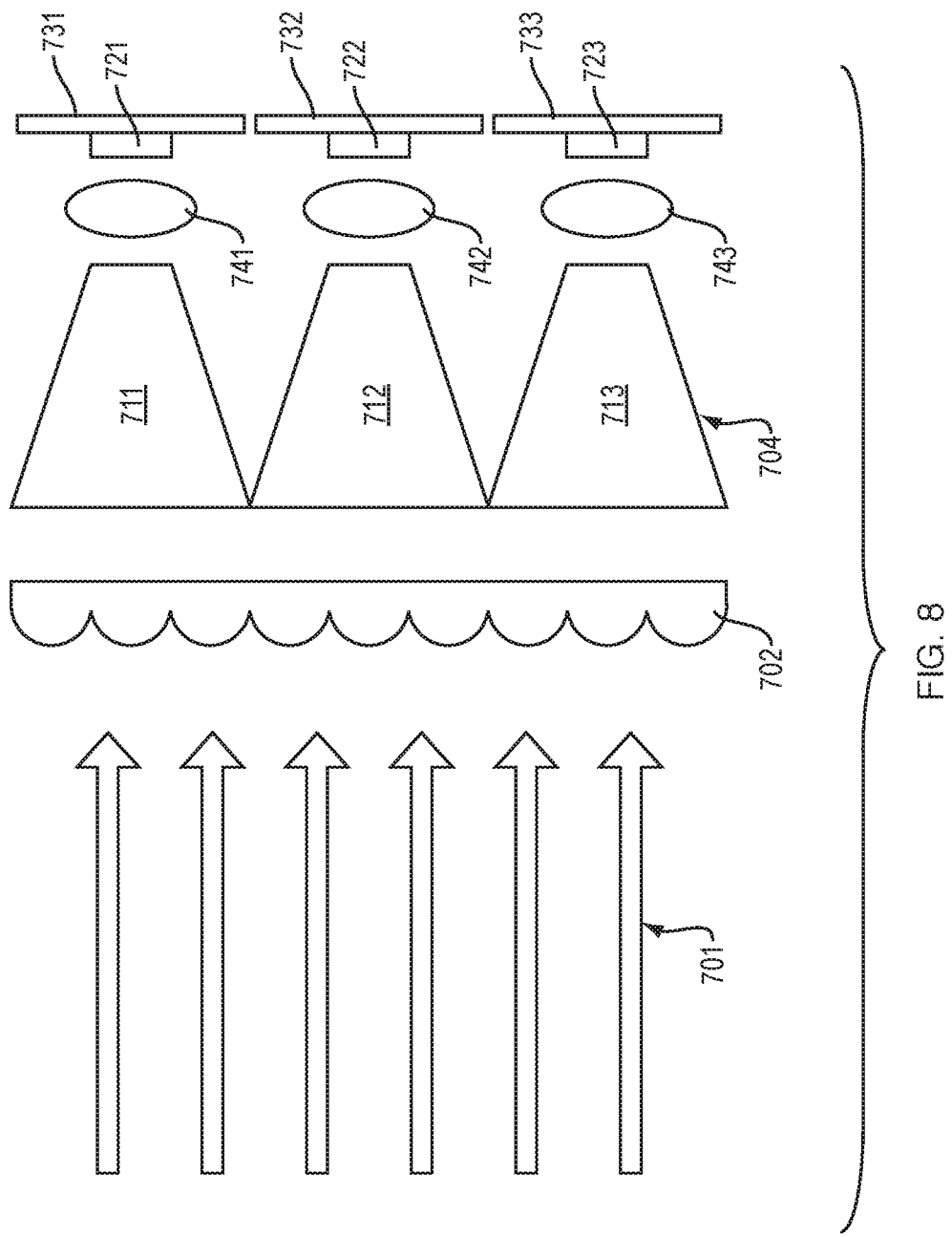
FIG. 8 shows relay lenses that image the narrow ends of fiber optic tapers onto image sensors.

FIG. 8 shows relay lenses that image the narrow ends of fiber optic tapers onto image sensors, in an illustrative implementation of this invention. In FIG. 8: (a) relay lens 741 relays light from taper 711 to image sensor 721; (b) relay lens 742 relays light from taper 712 to image sensor 722; and (c) relay lens 743 relays light from taper 713 to image sensor 723.

In some embodiments of this invention, prisms are used. For example, in some cases: (a) multiple cameras capture images; (b) the cameras are too large for all of the cameras to fit directly behind a lenslet array; and (c) to solve this problem, the cameras are positioned further apart from each other and prisms are used to steer light from different parts of the lenslet array to different cameras.

In some embodiments: (a) multiple lenslet arrays are positioned at the same optical distance from the objective; and (b) prisms are used to steer light to the different lenslet arrays.

Figure 9:
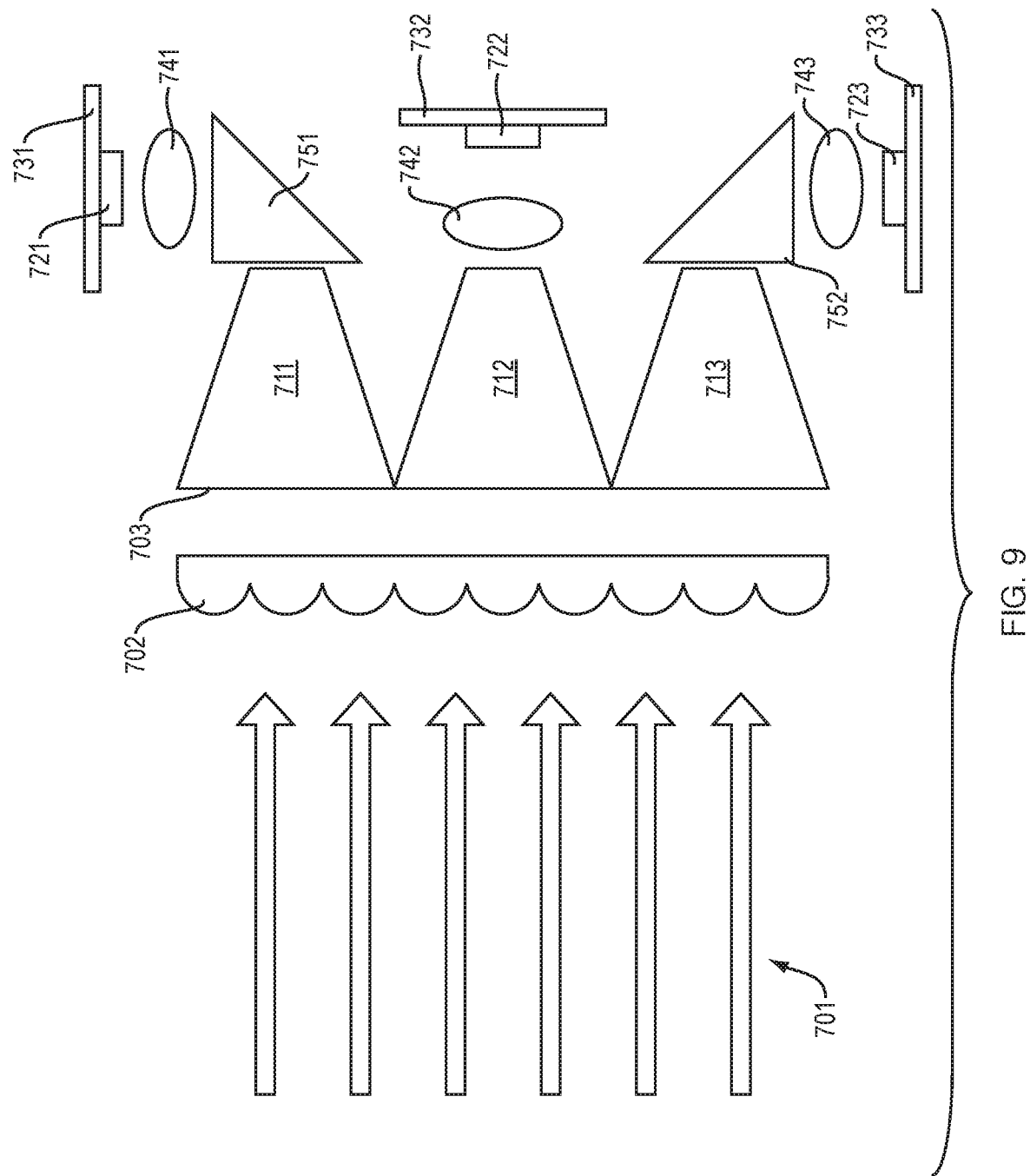
FIG. 9 and FIG. 10 each show an example of prisms steering light from different regions of a lenslet array to different cameras.
Figure 10:
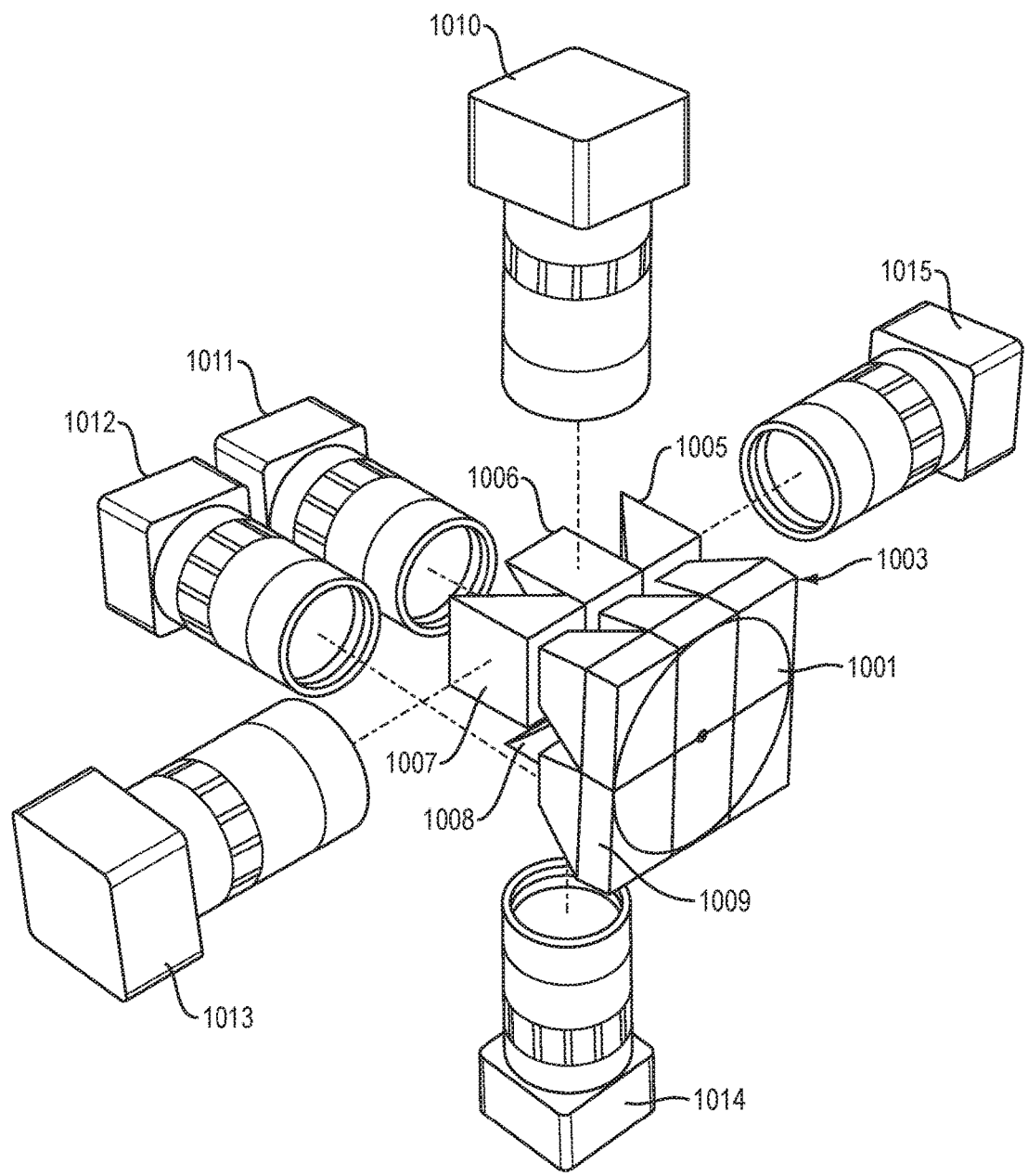

FIG. 9 and FIG. 10 each show an example of prisms steering light from different regions of a lenslet array to different cameras.

In FIG. 9: (a) light travels from taper 711, then through prism 751, then through relay lens 741 to image sensor 721; and (b) light travels from taper 713, then through prism 752, and then through relay lens 743 to image sensor 723.

In FIG. 10, light travels through imagelets plane 1001. Then different portions of the light travel through different fiber optic tapers in taper array 1003. Light exiting some of tapers (e.g., 1009) travels directly to a camera (e.g., 1012) without passing through a prism. Light exiting some other tapers passes through a prism (e.g., 1005, 1006, 1007, 1008) that steers the light to a camera (e.g., 1010, 1011, 1012, 1013, 1014, 1015).

FIG. 11A shows two light field imagers at the same optical distance from the objective lens, in an illustrative implementation of this invention. In FIG. 11A, a double imager unit 200 comprises two light field imagers 100 and a beamsplitter unit 201. Beamsplitter unit 201 includes a beamsplitter 1110 that splits light 701, such that a portion (e.g., half) of light 701 is steered to a first light field imager 100 and another portion (e.g., half) of light 701 is steered to a second light field imager 100. Both light field imagers 100 are at the same optical distance from the objective.

Figure 11B:
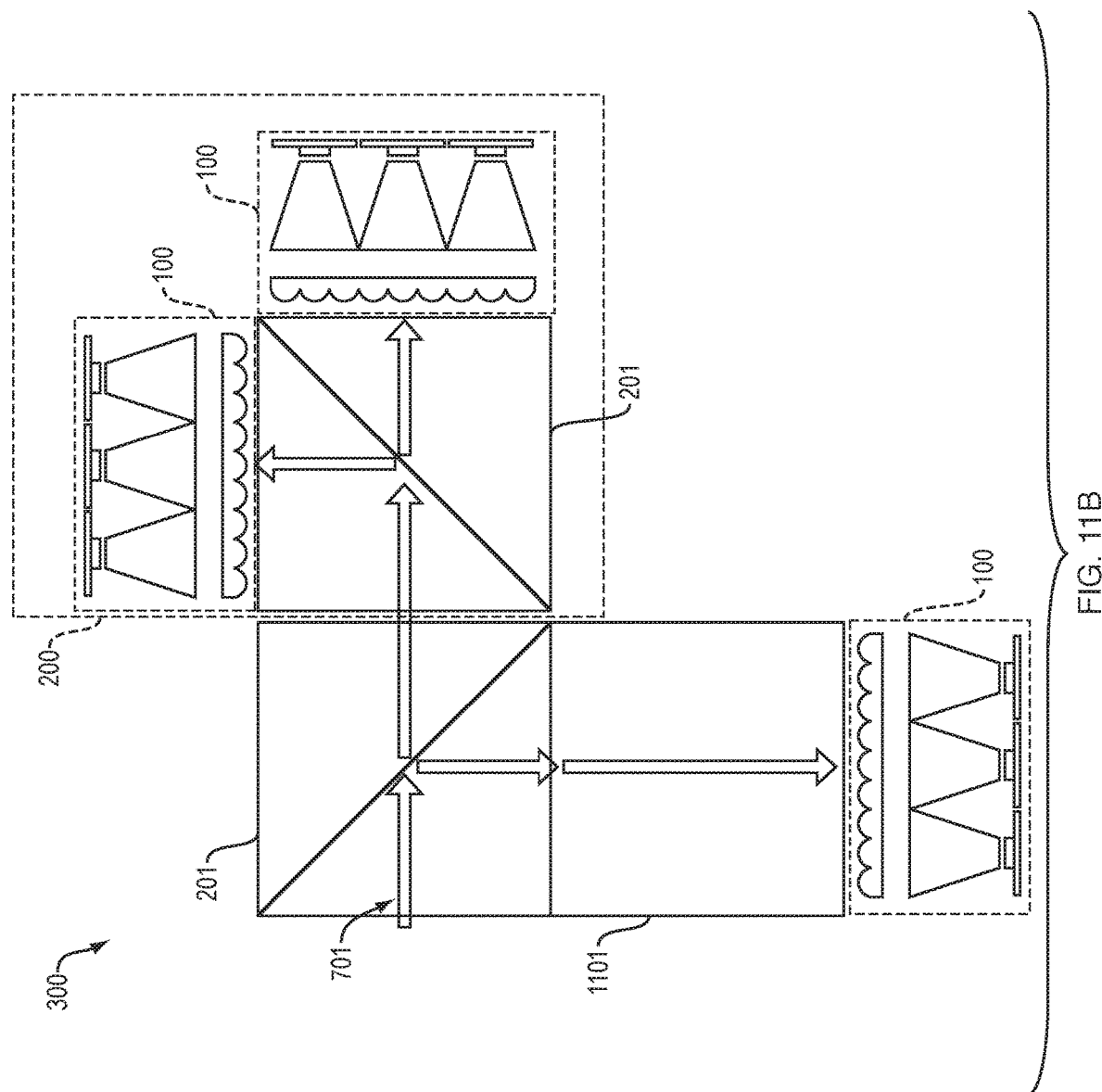
FIG. 11B shows three light field imagers at the same optical distance from the objective lens.

FIG. 11B shows three light field imagers at the same optical distance from the objective lens, in an illustrative implementation of this invention. In FIG. 11B, a triple imager unit 300 comprises a double imager unit 200, an additional light field imager 100, an additional beamsplitter unit 201 and a spacer unit 1101. A spacer unit 1101 is interposed in the optical path to the light field imager 100 in the bottom of FIG. 11B. The length of spacer unit 1101 is such that all three light field imagers 100 are at the same optical distance from the objective.

Figure 11C:
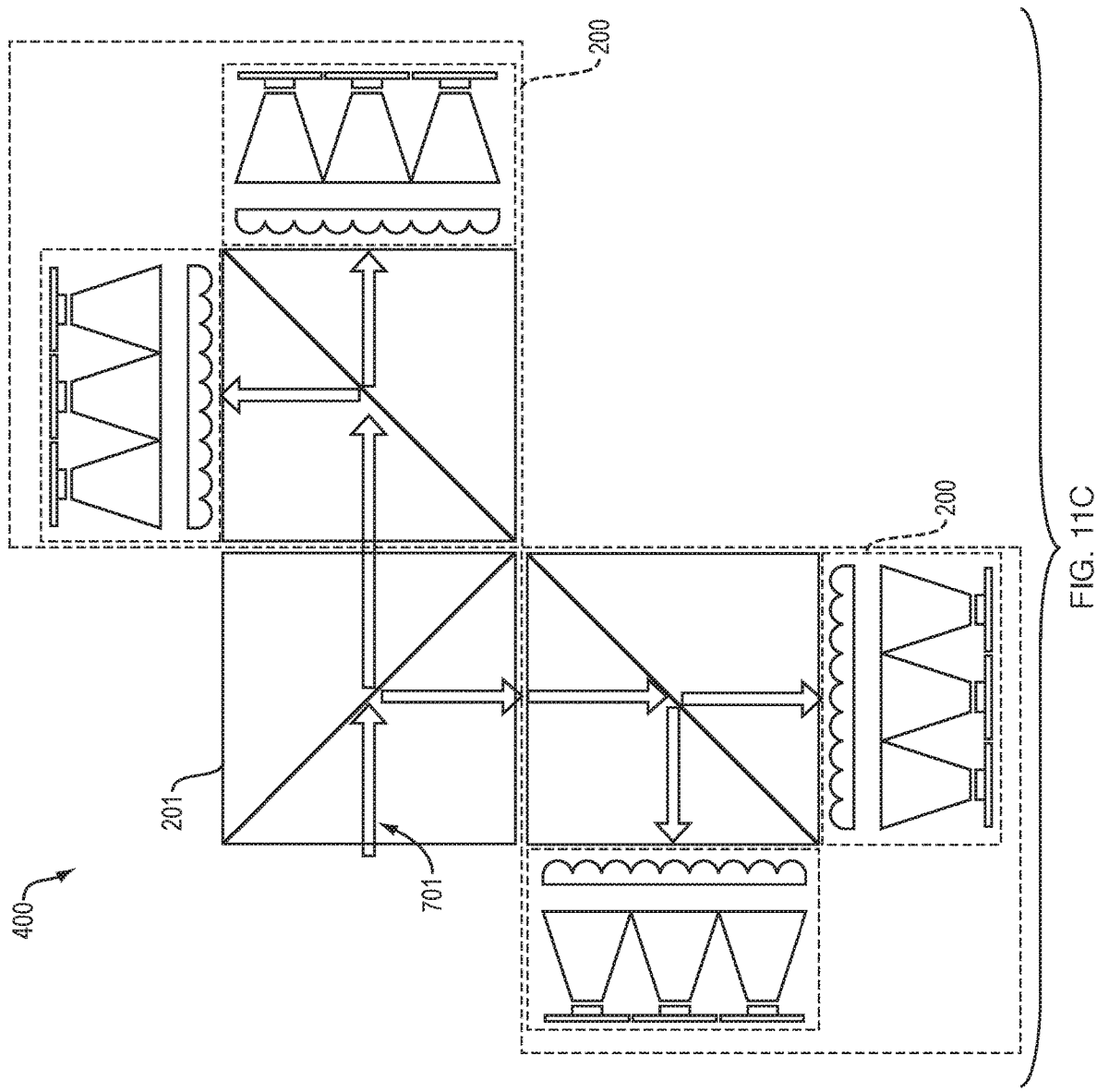
FIG. 11C shows four light field imagers at the same optical distance from the objective lens.

FIG. 11C shows four light field imagers at the same optical distance from the objective lens, in an illustrative implementation of this invention. In FIG. 11C, a quadruple imager unit 400 comprises two double imager units 200 and an additional beamsplitter 201. All four light field imagers are at the same optical distance from the objective.

Figure 11D:
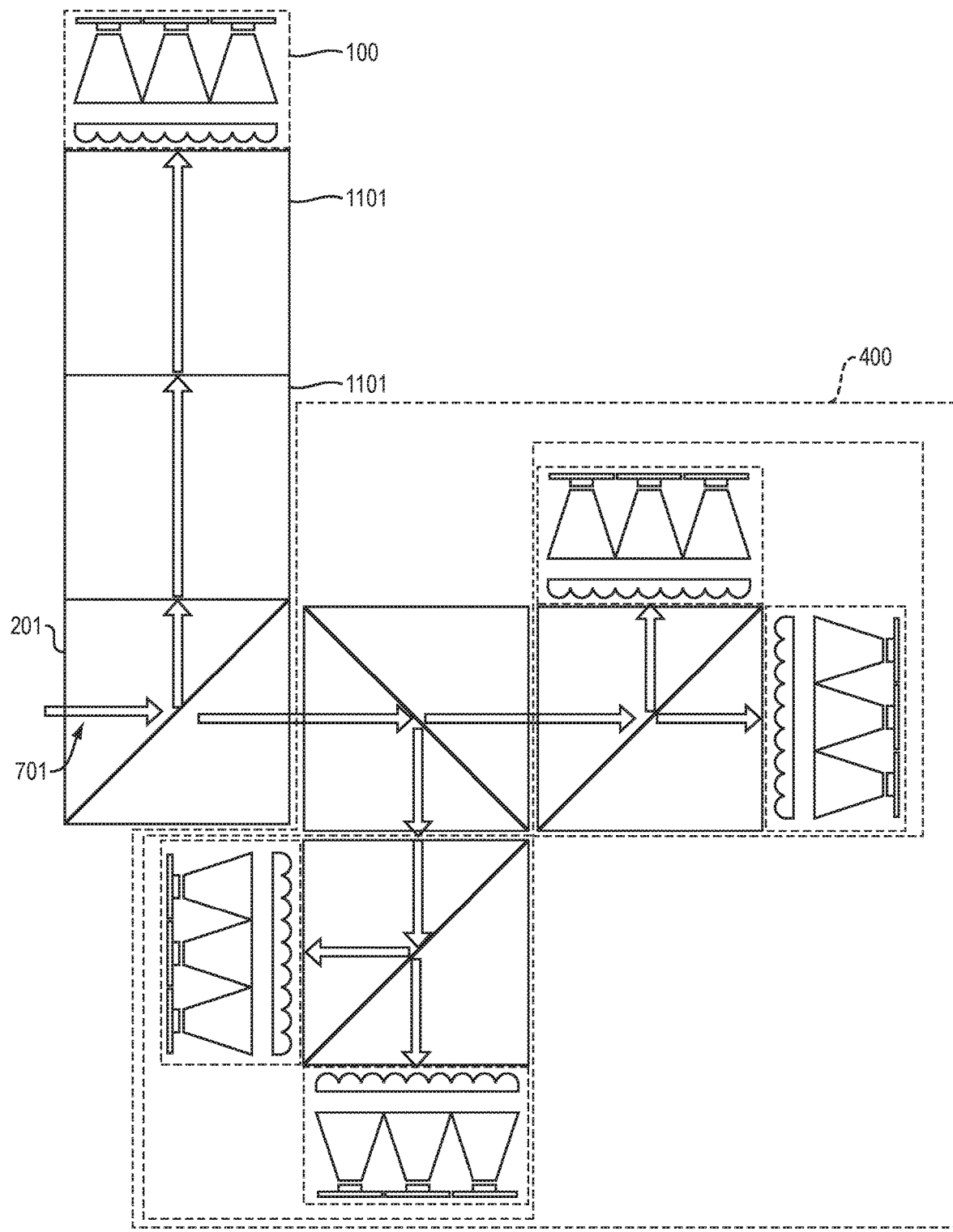
FIG. 11D shows five light field imagers at the same optical distance from the objective lens.

FIG. 11D shows five light field imagers at the same optical distance from the objective lens, in an illustrative implementation of this invention In FIG. 11D, a quintuple imager unit comprises a quadruple imager unit 400, an additional light field imager 100, an additional beamsplitter 201,and two spacer units 1101. The length of the two spacer units 1101 is such that all five light field imagers are at the same optical distance from the objective.

Figure 11E:
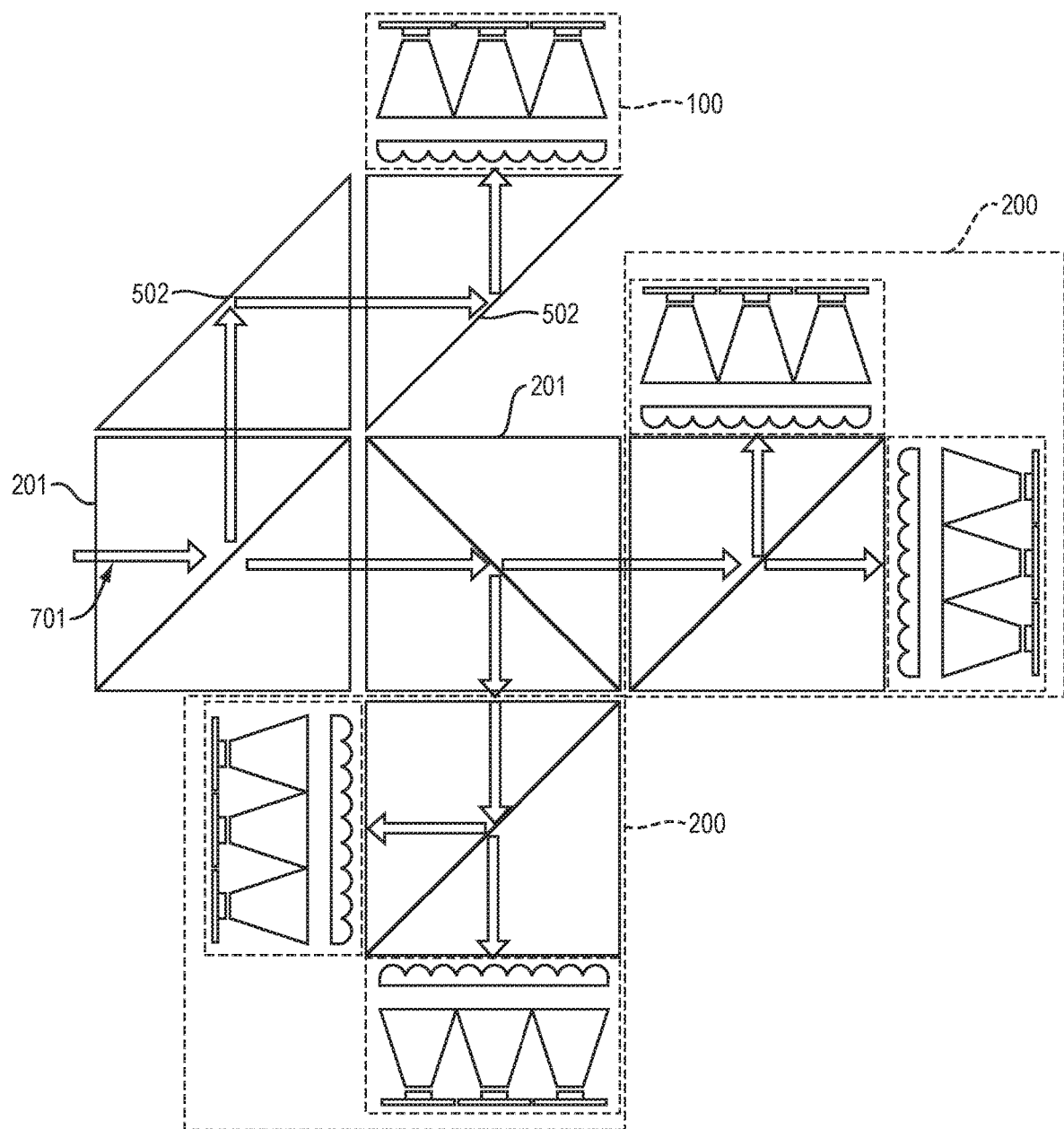
FIG. 11E shows a more compact configuration, in which beamsplitters and prisms steer light to five light field imagers at the same optical distance from the objective lens.

FIG. 11E shows a more compact configuration, in which beamsplitters and prisms steer light to five light field imagers at the same optical distance from the objective lens, in an illustrative implementation of this invention. In FIG. 11E, a quintuple imager unit comprises two double imager units 200, an additional light field imager 100, two additional beamsplitter units 201, and two prisms 502. The geometry of the beamsplitter units 201 and prisms 502 is such that all five light field imagers are at the same optical distance from the objective.

In FIGS. 6-9 and 11A-11E, light 701 has already passed through the objective lens and one or more other optical elements of the LFM. Thus, loosely speaking, it is light from the objective end of the LFM.

In many cases, one or more light-steering optical elements (e.g., fiber optic tapers, prisms, mirrors or beamsplitters) are used to direct light to multiple image sensors such that all of light in the image circle of the LFM is captured simultaneously. In these cases, the image sensors are stationary with respect to the microscope tube of the LFM.

Alternatively, in some cases, an image sensor is scanned over the image circle of the LFM.

Figure 12:
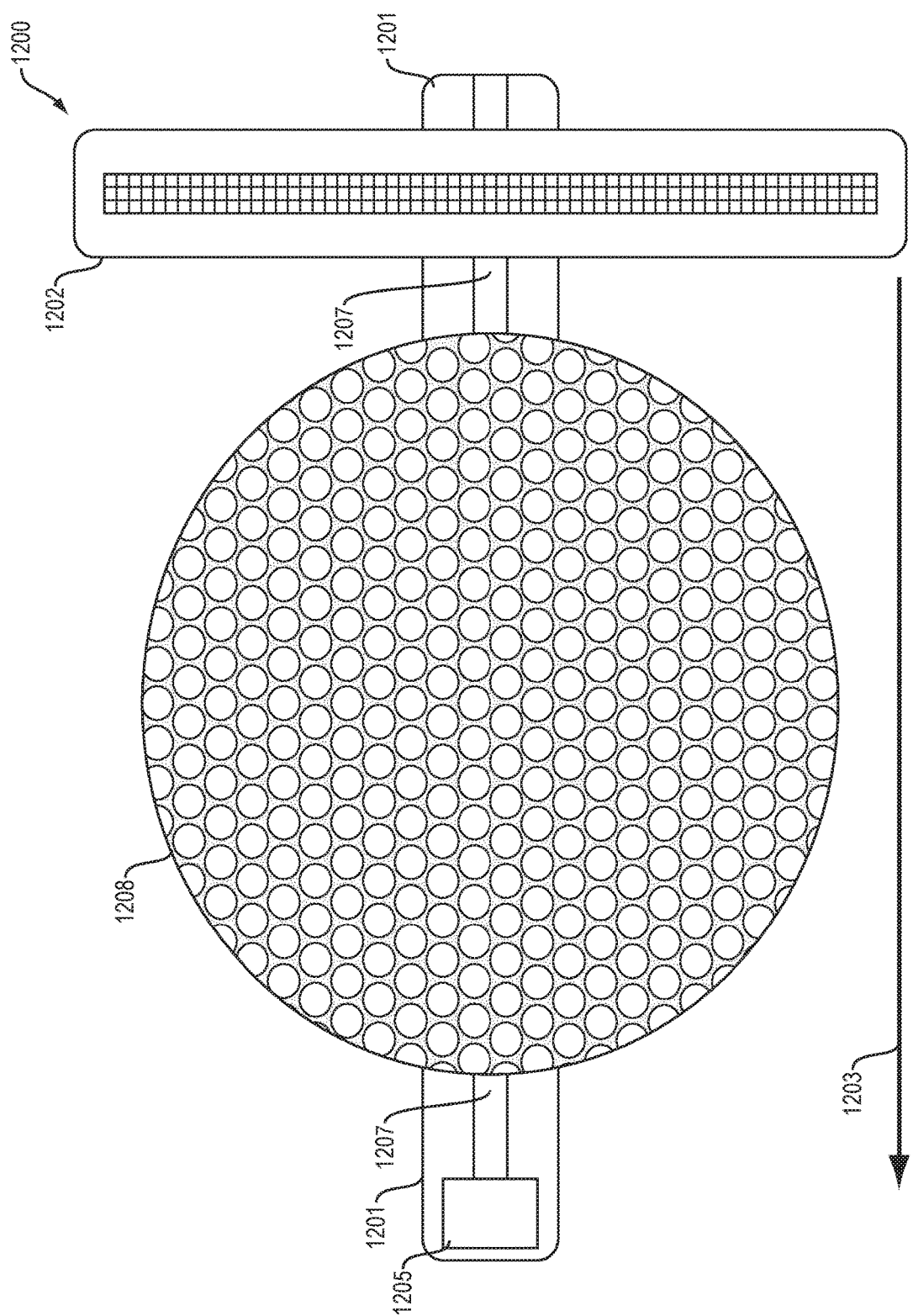
FIGS. 12 and 13 each show a scanning unit for actuating motion of a sensor to scan a light field image.
Figure 13:
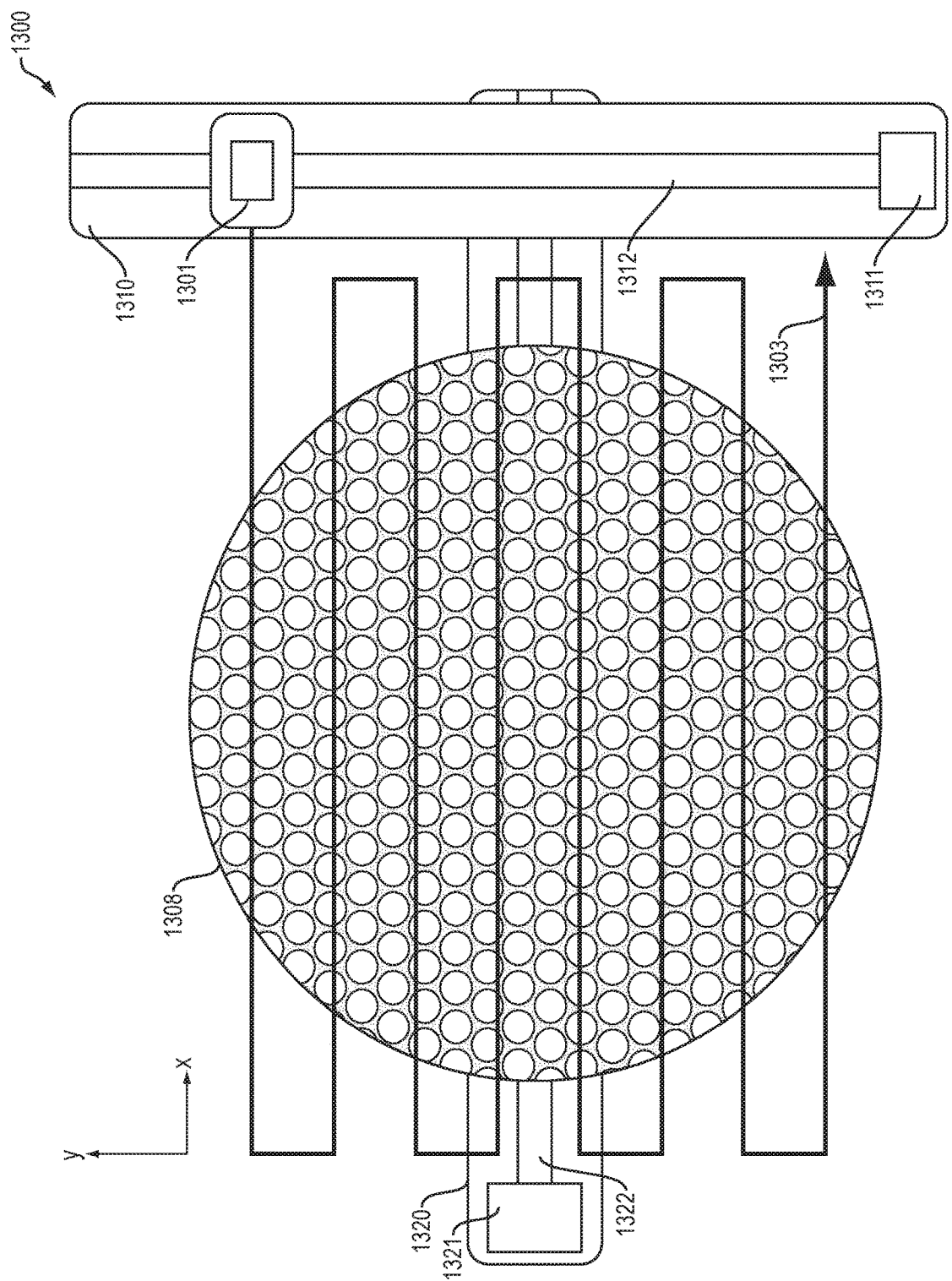

FIGS. 12 and 13 each show a scanning unit for actuating motion of a sensor to scan a light field image, in illustrative embodiments of this invention. In FIG. 12, the scanning movement is in a straight line. In FIG. 13, the scanning movement is zig-zag.

In FIG. 12, scanning unit 1200 comprises a linear actuator 1201 and elongated image sensor 1202. Actuator 1201 includes a motor 1205 and a linear track 1207. The actuator moves image sensor 1202 in direction 1203 along track 1207, such that the sensor 1202 captures a digital image of optical light field image 1208.

In FIG. 13, scanning unit 1300 comprises: (a) a first linear actuator 1310 that actuates motion of image sensor 1301 in directions parallel to the y-axis; and (b) a second linear actuator 1320 that actuates motion of the image sensor 1301 in directions parallel to the x-axis. The combined motions actuated by the first and second actuators 1310, 1320 cause the image sensor to move in zig-zag path 1303 (or in any other path in the x-y plane, including any raster path) such that the sensor 1301 captures a digital image of optical light field image 1308.

In FIG. 13, the first linear actuator 1310 comprises a motor 1311 that actuates motion of the sensor 1301 along track 1312. The second linear actuator 1320 comprises a motor 1321 that actuates motion of the sensor 1301 along track 1322.

Figure 14:
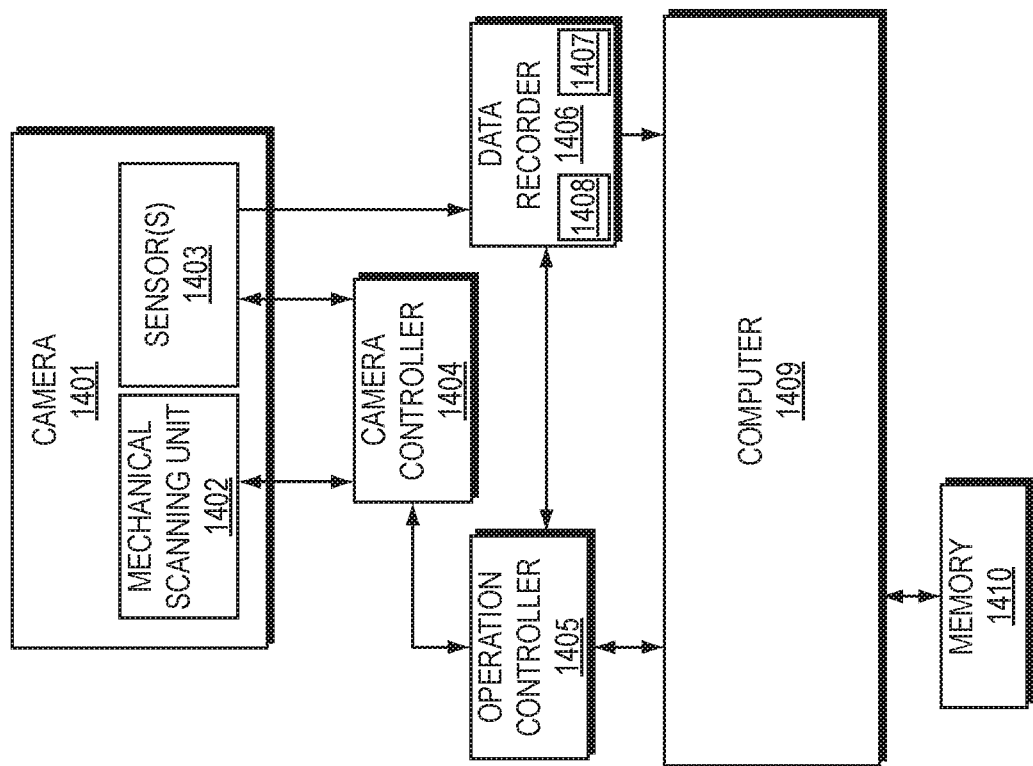
FIG. 14 shows hardware for controlling an LFM.

FIG. 14 shows hardware for controlling an LFM, in an illustrative implementation of this invention. One or more cameras 1401 each include one or more image sensors 1403 for capturing digital images of a light field.

Optionally, camera 1401 includes a mechanical scanning unit 1402 for moving an image sensor such that the sensor scans an optical light field image. For example, in some cases, mechanical scanning unit 1402 comprises scanning unit 1200 in FIG. 12 or comprises scanning unit 1300 in FIG. 13.

A camera controller 1404 controls camera sensor(s) 1403 and, in some cases, also controls the mechanical scanning unit 1402. A data recorder 1406 records data captured by the sensor(s) 1403. Data recorder 1406 includes a computer (e.g., a microcontroller) 1408 and a memory device 1407. An operation controller 1405 controls camera controller 1404 and interfaces with, and in some cases helps to control, data recorder 1406. In addition, computer 1409 performs image processing computations and overall control of the LFM. Computer 1409 stores data in memory 1410.

Prototype

The following three paragraphs describe a prototype of this invention. This prototype is a non-limiting example of this invention.

In this prototype, the LFM comprises an infinite conjugate LFM, with an infinity corrected objective. The tube lens comprises four large (120 mm) achromatic doublets (EO-70163). These four lenses comprise two symmetric pairs to minimize odd order aberrations. The resulting image area is 113 cm$^2$ which is 27.2 times larger than that created by a standard 23 mm microscope tube lens and 13.2 times larger than that created by a standard 33 mm tube lens. This prototype LFM images a volume of φ 2400 μm×600 μm at 50× magnification.

In this prototype with achromatic tube lens, the zero displacement relative to the chromatic shift is centered in the green wavelength range. Filtering the microscope to this green wavelength range offers the least amount of chromatic dispersion, optimally maintaining the diffraction limit. In order to approximately optimize to this green wavelength range, an incoherent Halogen illumination is diffused and filtered to 500-600 nm.

In this prototype, a long working distance (WD) minimizes potential optical aberration that is displaced relative to the WD. Specifically, in this prototype, the objective lens comprises a 20× Mitutoyo™ 0.28 NA long working distance (WD) objective. A long WD is advantageous, because, in many cases, LFMs focus at axial planes that are displaced relative to their nominal WD.

This invention is not limited to the prototype described in the preceding three paragraphs; and may be implemented in many different ways.

Field of Endeavor and Problem Faced by the Inventors

A field of endeavor of this invention is increasing the number of diffraction-limited resolvable spots that a light field microscope (LFM) captures.

The inventors were faced by a problem: How to increase the information budget—that is, the number of diffraction-limited resolvable spots—that a light field microscope (LFM) captures.

In illustrative implementations of this invention, the problem is solved as follows: The information budget of an LFM is increased by increasing the field of view and image circle diameter of the microscope, while keeping the ratio of overall magnification of the LFM to the numerical aperture of the LFM unchanged. Alternatively, the information budget is increased by increasing the field of view and image circle diameter of the microscope by a first factor, while increasing the ratio of overall magnification of the LFM to the numerical aperture of the LFM by a smaller, second factor.

Computers

In exemplary implementations of this invention, one or more electronic computers (e.g. 1404, 1405, 1408, 1409) are programmed and specially adapted: (1) to control the operation of, or interface with, hardware components of a LFM, including image sensors and any mechanical scanning unit; (2) to perform any digital image processing, digital image analysis or computer vision algorithm; (3) to perform any other calculation, computation, program, algorithm, computer function or computer task described or implied above; (4) to receive signals indicative of human input; (5) to output signals for controlling transducers for outputting information in human perceivable format; and (6) to process data, to perform computations, to execute any algorithm or software, and to control the read or write of data to and from memory devices. The one or more computers may be in any position or positions within or outside of the LFM. For example, in some cases (a) at least one computer is housed in or together with other components of the LFM, such as an imaging sensor, and (b) at least one computer is remote from other components of the LFM. The one or more computers are connected to each other or to other components in the LFM either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to: (1) to control the operation of, or interface with, hardware components of a LFM, including image sensors and any mechanical scanning unit; (2) to perform any digital image processing, digital image analysis or computer vision algorithm; (3) to perform any other calculation, computation, program, algorithm, computer function or computer task described or implied above; (4) to receive signals indicative of human input; (5) to output signals for controlling transducers for outputting information in human perceivable format; and (6) to process data, to perform computations, to execute any algorithm or software, and to control the read or write of data to and from memory devices.

Actuators

In some implementations, one or more actuators actuate scanning motion, in which one or more imaging sensors move relative to an optical image being scanned. Each of these actuators comprises any kind of actuator, including a linear, rotary, electrical, piezoelectric, electro-active polymer, mechanical or electro-mechanical actuator. In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists.

To say that a process is "in accordance with" instructions means that signals encoding or derived from the instructions are used to control hardware performing the process. To say that a process is "in accordance with" instructions does not mean that actual performance must exactly match specifications in the instructions. For example, hardware operating within tolerances may perform in a manner that does not exactly match the specifications.

To compute "based on" specified data means to perform a computation that takes the specified data as an input.

Here are some non-limiting examples of a "camera": (a) a digital camera; (b) a video camera; (c) a light sensor, (d) a set or array of light sensors; (e) an imaging system; (f) a light field camera or plenoptic camera; (g) a time-of-flight camera; or (h) an optical instrument that records images. A camera includes any computers or circuits that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

The "diameter" of a lens means the clear aperture of the lens.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

As used herein, "field of view" or "FOV" means, for a given image circle in a microscope, the diameter of the image circle divided by the overall magnification of the microscope. In an infinite conjugate microscope, the given image circle is the image circle of the real image formed by the tube lens. In the finite conjugate microscope shown in FIG. 3, the given image circle is the image circle at the real image formed by the reimaging lens 307.

To reduce (or decrease) by a factor of X means to divide by X To increase by a factor of X means to multiply by X To increase by a factor of 1 means to leave unchanged. To reduce by a factor of 1 means to leave unchanged. To increase by a factor of Y, where Y is a positive number less than one, means to multiple by Y and thus to reduce. To reduce by a factor of Y, where Y is a positive number less than one, means to divide by Y and thus to increase.

A "finite conjugate" microscope means a microscope with a finite conjugate objective lens.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

Light is "from" an object if the light has at any time reflected from or been transmitted through the object or emitted by the object, regardless of whether the light has subsequently reflected from or been transmitted through any other object. For example, light that has passed through an objective lens and then through a tube lens is "from" both the objective lens and the tube lens.

In the context of a microscope, "front" is optically closer to the object being imaged, and "rear" is optically farther from the object, during normal operation of the microscope. In the context of a camera, "front" is optically closer to the scene being imaged, and "rear" is optically farther from the scene, during normal operation of the camera. In the context of a microscope or camera, the terms "before", "after" and "behind" shall be construed in like manner.

"Herein" means in this document, including text, specification, claims, abstract, and drawings.

To say that a set of lenslets is "hexagonally packed" means that the lenslets in the set are co-centered with hexagons of a hexagonal lattice. The lenslets may be abutting, or may have gaps between them.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

An "infinite conjugate" microscope means a microscope that has an infinity-corrected objective lens.

"Information budget" of a microscope means the maximum number of diffraction-limited resolvable spots that can exist at any wavelength of light in any real image formed by the microscope without modifying the microscope in any way.

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"K" means a variable that is a positive real number. To increase by a factor of K means to multiply by K.

"Lens" means a single lens or a compound lens. Diffractive lens?

As used herein, "lenslet" means a lens. The term "lenslet" does not imply a particular size or range of sizes of a lens.

"Light" means electromagnetic radiation of any frequency. For example, "light" includes, among other things, visible light and infrared light. Likewise, any term that directly or indirectly relates to light (e.g., "imaging ") shall be construed broadly as applying to electromagnetic radiation of any frequency.

"Light field image" means a digital image that contains angle-dependent information regarding light incident on a geometric surface, such that for each respective angle, out of a set of multiple angles of light incident at a given position in the surface, the digital image contains information regarding intensity of light incident at the given position from the respective angle.

"Light field microscope" or "LFM" means a microscope configured to capture a light field image.

As used herein, "nominal magnification" of an objective lens of an infinity-corrected LFM means 200 mm/f, where f is the focal length of the objective lens.

"Optical distance" means the distance OD specified in the following two sentences. In a medium of constant refractive index, OD=nd, where n is the refractive index and d is the geometric length of the light path. In a medium of varying refractive index, $OD=\int_C n(s)ds$, where C is the light path, s is distance along light path C, and n is local refractive index as a function of distance s. A light path between two points may be bent (e.g., folded), in which case the geometric length of the light path is longer than the straight line physical distance between the two points.

The term "or" is inclusive, not exclusive. For example A or B is true if A is true, or B is true, or both A or B are true. Also, for example, a calculation of A or B means a calculation of A, or a calculation of B, or a calculation of A and B.

As used herein, "parameter" means a variable. For example: (a) if y=f(x), then both x and y are parameters; and (b) if z=f(x(t), y(t)), then t, x, y and z are parameters. A parameter may represent a physical quantity, such as pressure, temperature, or delay time.

A parenthesis is simply to make text easier to read, by indicating a grouping of words. A parenthesis does not mean that the parenthetical material is optional or may be ignored.

The "pitch" between two lenslets means the distance between (i) the center of one of the lenslets and (ii) the center of the other lenslet.

To say that a set of lenslets is "rectangular-packed" means that the lenslets in the set are co-centered with rectangles of a rectangular lattice. The lenslets may be abutting, or may have gaps between them.

To say that a microscope's sensor has a resolution that is "at the resolution limit" of an optical image means that T(F)=0.09 under the Rayleigh criterion for at least one wavelength of light, where T is the modulation transfer function of the sensor, F is a spatial frequency limit of the image, which is equal to 1/S, and S is the diffraction-limited resolvable distance of the microscope as defined by Equation 1 above. To say that a microscope's sensor has a resolution that is "not less than the resolution limit" of an optical image means that T(F)>0.09 under the Rayleigh criterion for at least one wavelength of light, where T is the modulation transfer function of the sensor, F is a spatial frequency limit of the image, which is equal to 1/S, and S is the diffraction-limited resolvable distance of the microscope as defined by Equation 1 above.

As used herein, the term "set" does not include a group with no elements. Mentioning a first set and a second set does not, in and of itself, create any implication regarding whether or not the first and second sets overlap (that is, intersect).

As used herein, "shifted by a distance" means positioned at a distance. To say that X is "shifted by a distance" has no implication regarding whether or not X is currently moving.

"Some" means one or more.

As used herein, "spot size" of a microscope means the product of (1) the smallest resolvable distance between two objects as seen on the image plane of the microscope and (2) the overall magnification of the microscope.

As used herein, a "subset" of a set consists of less than all of the elements of the set.

"Substantially" means at least ten percent. For example: (a) 112 is substantially larger than 100; and (b) 108 is not substantially larger than 100.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

In some implementations of this invention, the LFM includes a high resolution camera such as a 12 megapixel CMOS (complementary metal-oxide-semiconductor) camera. Using a high resolution camera in the LFM has numerous advantages, including higher frame rate, acquisition of multiple plane, higher resolution, and decrease in stitching requirements.

In some implementations, the tube lens comprises apochromatic lenses. Using aprochromatic lenses in the LFM has advantages, including: (i) facilitating image capture over multi-spectral ranges; and (ii) the ability to work in multiple fluorescing wavelengths without chromatic aberration.

In some implementations of this invention, wavefront correction improves the LFM's resolution. For example, in some cases, the LFM includes a Shack-Hartmann wavefront sensor and adaptive optics that correct wavefront distortions due to optical aberrations, including (i) optical aberrations in lenslet arrays, (ii) optical aberrations due to improperly positioned lenses, and (iii) optical aberrations created within samples. In some cases, the wavefront correction is dynamic.

In some implementations of this invention, a computer performs algorithms to computationally correct aberrations. Software corrections of aberrations in the LFM has numerous advantages, including facilitating going below the diffraction limit. For example, in some cases, the computational correction of aberrations includes one or more of the following: (a) a reconstruction algorithm similar to limited baseline computed tomography, but that also accounts for diffraction, and that incorporates an additional deconvolution step for enhanced resolution; or (b) super resolution and deconvolution algorithms to improve the lateral resolution to below 1 micron.

In illustrative implementations, modifications to a LFM may be made in many ways, including by (a) physically replacing existing components with new components; or (b) by physically modifying existing components. For example, the focal length of a lens may be changed (i) by replacing an existing lens with a new lens; or (ii) by modifying an existing lens (e.g., by grinding it to change its curvature).

In one aspect, this invention is a method of increasing the information budget of a microscope, which microscope includes an objective lens, a tube lens, and a digital image sensor, the method comprising: (a) increasing the numerical aperture of the microscope by a factor of X, where X is a real number that is not less than 1; (b) increasing the focal length of the objective lens by a factor of Y, where Y is a real number greater than 1; and (c) increasing the focal length and the diameter of the tube lens by a factor of Z, where Z is a real number that is greater than 1 and that is sufficiently large such that, after giving effect to steps (a), (b) and (c) of this claim 1, the resolution of the sensor is not less than the resolution limit of the real optical image formed by light that is incident on the sensor and that is from the objective and tube lenses; wherein: (i) the objective lens is infinity-corrected; (ii) the microscope is a light field microscope; and (iii) I2 is greater than $I_1$ by a factor of $(X*Y)^2$ where $I_1$ is the information budget of the microscope before steps (a), (b) and (c) of claim 1 and $I_2$ the information budget of the microscope after steps (a), (b) and (c) of claim 1. In some cases, Y equals Z. In some cases, Y is greater than Z. In some cases, $M_2=M_1$, where $M_1$ is the overall magnification of the microscope before steps (a) and (b) in the first sentence of this paragraph and $M_2$ is the overall magnification of the microscope after said steps (a) and (b). In some cases, $N_2=N_1$, where $N_1$ is the numerical aperture of the microscope before said steps (a) and (b) and $N_2$ is the numerical aperture of the microscope after said steps (a) and (b). In some cases: (a) the focal length of the tube lens is increased by physically replacing the tube lens with another tube lens; and (b) the focal length of the objective lens is increased by physically replacing the objective lens with another objective lens. In some cases: (a) the tube lens forms an image circle at the back focal plane of the tube lens; (b) step (c) of the first sentence of this paragraph would, in the absence of any obstruction of light, increase the diameter of the image circle by a factor of Z, resulting in an expanded image circle; (c) the microscope includes a tube; (d) light from the objective lens travels inside the tube; (e) for each respective point along a longitudinal axis of the tube, the tube has an internal tube diameter that is equal to the diameter of the tube from inner wall to inner wall of the tube at that respective point; and (f) the internal tube diameter is increased, at each point along the longitudinal axis, by an amount at least sufficient to cause the tube to not obstruct any light from the objective lens that would otherwise pass through the tube lens and travel to the expanded image circle. Each of the cases described above in this paragraph is an example of the method described in the first sentence of this paragraph, and is also an example of an embodiment of this invention that may be combined with other embodiments of this invention.

In another aspect, this invention is a microscope comprising: (a) an infinity-corrected objective lens; (b) a tube lens for refracting light from the objective lens; (c) one or more lenslet arrays; and (d) one or more digital image sensors, which image sensors are configured for capturing light field images; wherein (i) each respective lenslet array is positioned such that light from the tube lens passes through the respective lenslet array and travels to a digital image sensor; and (ii) the microscope has an overall magnification that is substantially greater than the nominal magnification of the objective lens. In some cases, the microscope does not include any magnifying optical element other than the tube lens and the objective lens. In some cases: (a) the microscope has an information budget that is greater by a factor of $K^2$ than a modified information budget; (b) K is a positive real number; and (c) the modified information budget is an information budget that the microscope would have if the microscope were modified by reducing the focal length of the objective lens and the focal length and diameter of the tube lens by a factor of K, without changing the numerical aperture of the microscope and without changing the overall magnification of the microscope. In some cases: (a) the set of lenslet arrays includes a first lenslet array and a second lenslet array; (b) the first lenslet array is at first optical distance from the objective lens and the second lenslet array is at a second optical distance from the objective lens; and (c) the first optical distance is not equal to the second optical distance. In some cases: (a) the set of lenslet arrays comprises multiple lenslet arrays; and (b) the multiple lenslet arrays are all positioned at the same optical distance from the objective lens. In some cases: (a) each respective lenslet array is shifted by a distance relative to a specific image sensor that receives light from the respective lenslet array, which distance is in a direction parallel to a surface of the specific image sensor; (b) the distance is different for each lenslet array in the set of lenslet arrays; and (c) a computer is configured to calculate a combined digital image, by computationally combining digital images that are captured by the image sensors, such that the combined image includes overlap regions, each of which overlap regions records light that passed through lenslets of more than lenslet array. In some cases, lenslets in each lenslet array, respectively, are hexagonally packed. In some cases: (a) the microscope has an information budget that is greater than a modified information budget by a factor of $K^2$; (b) the modified information budget is an information budget that the microscope would have if the microscope were modified (i) by reducing the focal length and diameter of the tube lens by a factor of K and (ii) by increasing the ratio of the nominal magnification of the objective lens to the numerical aperture of the objective lens by a factor of K, and (c) K is a real number greater than 1. Each of the cases described above in this paragraph is an example of the microscope described in the first sentence of this paragraph, and is also an example of an embodiment of this invention that may be combined with other embodiments of this invention.

In another aspect, this invention is a microscope comprising: (a) a finite conjugate objective lens; (b) a magnifying relay lens for refracting light from the objective lens; (c) a set of one or more lenslet arrays; and (d) a set of one or more digital image sensors for capturing light field images; wherein (i) each respective lenslet array is positioned such that light from the objective lens and relay lens passes through the respective lenslet array and travels to a digital image sensor, (ii) the microscope has an overall magnification that is substantially greater than the nominal magnification of the objective lens, (iii) the microscope has an information budget that is greater than a modified information budget by a factor of $K^2$, (iv) the modified information budget is an information budget that the microscope would have if the microscope were modified (A) by removing the relay lens to reduce the overall magnification of the microscope by a factor of K, and (B) by increasing the ratio of the magnification of the objective lens to the numerical aperture of the objective lens by a factor of K, and (v) K is a real number greater than 1. In some cases: (a) the set of lenslet arrays includes a first lenslet array and a second lenslet array; (b) the first lenslet array is at first optical distance from the objective lens and the second lenslet array is at a second optical distance from the objective; and (c) the first optical distance is not equal to the second optical distance. In some cases: (a) the set of lenslet arrays comprises multiple lenslet arrays; and (b) the multiple lenslet arrays are all positioned at the same optical distance from the objective lens. In some cases: (a) each respective lenslet array is shifted by a distance relative to a specific image sensor that receives light from the respective lenslet array, which distance is in a direction parallel to a surface of the specific image sensor; (b) the distance is different for each lenslet array in the set of lenslet arrays; and (c) a computer is configured to calculate a combined digital image, by computationally combining digital images that are captured by the image sensors, such that the combined image includes overlap regions, each of which overlap regions records light that passed through lenslets of more than lenslet array. In some cases, the lenslets in each lenslet array, respectively, are hexagonally packed. Each of the cases described above in this paragraph is an example of the microscope described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. A method comprising:
   (a) refracting light by passing the light through an infinity-corrected objective lens, then through a tube lens, and then through a lenslet array; and
   (b) then capturing a light field image formed by the light; wherein
   (i) the infinity-corrected objective lens has a focal length,
   (ii) the tube lens has a focal length that is longer than 200 millimeters, and
   (iii) the microscope has an overall magnification that is substantially greater than a nominal magnification of the objective lens, which nominal magnification is equal to 200 millimeters divided by the focal length of the objective lens.

2. The method of claim 1, wherein the tube lens has a focal length of at least 225 millimeters.

3. The method of claim 1, wherein the tube lens has a focal length of at least 300 millimeters.

4. The method of claim 1, wherein lenslets in the lenslet array are hexagonally packed.

5. The method of claim 1, wherein the focal length of the tube lens is at least 400 millimeters.

6. A method comprising:
(a) refracting light by passing the light through an infinity-corrected objective lens, then through a tube lens, and then through a lenslet array; and
(b) then capturing a light field image formed by the light;
wherein the tube lens has a focal length that is longer than 200 millimeters.

7. The method of claim 6, wherein the tube lens has a focal length of at least 225 millimeters.

8. The method of claim 6, wherein the tube lens has a focal length of at least 300 millimeters.

9. The method of claim 6, wherein lenslets in the lenslet array are hexagonally packed.

10. The method of claim 6, wherein the focal length of the tube lens is at least 400 millimeters.

11. The method of claim 6, wherein:
(a) the objective lens, tube lens, and lenslet array are parts of a microscope; and
(b) the method further comprises actuating motion of the image sensor to scan the image sensor over an image circle of the microscope.

12. A method comprising:
(a) refracting light by passing the light through an infinity-corrected objective lens and then through a tube lens;
(b) then further refracting the light by causing different portions of the light to pass through different lenslet arrays in a set of multiple lenslet arrays, in such a way that each of the portions passes through only one lenslet array in the set of lenslet arrays; and
(c) capturing light field images formed by the light;
wherein the tube lens has a focal length that is longer than 200 millimeters.

13. The method of claim 12, wherein:
(a) the set of lenslet arrays includes a first lenslet array and a second lenslet array;
(b) the first lenslet array is at first optical distance from the objective lens and the second lenslet array is at a second optical distance from the objective lens;
(c) the first optical distance is not equal to the second optical distance;
(d) the first lenslet array is positioned at a first lateral distance relative to a specific image sensor that receives light from the first lenslet array, which first lateral distance is in a direction parallel to a surface of the specific image sensor;
(e) the second lenslet array is positioned at a second lateral distance relative to a particular image sensor that receives light from the second lenslet array, which second lateral distance is in a direction parallel to a surface of the particular image sensor; and
(f) the first lateral distance is not equal to the second lateral distance.

14. The method of claim 12, wherein:
(a) each specific lenslet array in the set of lenslet arrays
(i) is at an optical distance from the objective lens, which optical distance is equal to that for each other lenslet array in the set, and
(ii) is positioned at a lateral distance relative to a specific image sensor that receives light from the specific lenslet array, which lateral distance is in a direction parallel to a surface of the specific image sensor; and
(b) the lateral distance is different for each lenslet array in the set of lenslet arrays.

15. The method of claim 12, wherein (a) each of the light field images captures light that has passed through a different lenslet array in the set of lenslet arrays; and
(b) the method further comprises calculating a combined digital image, by computationally combining the light field images.

16. The method of claim 12, wherein:
(a) each of the light field images captures light that has passed through a different lenslet array in the set of lenslet arrays;
(b) the method further comprises calculating a combined digital image, by computationally combining the light field images.
(c) each lenslet in the lenslet arrays refracts light to form an imagelet that has a diameter d; and
(d) in the combined image, imagelets overlap to form an overlapped pattern in which
(i) the shortest distance between a center of one imagelet and a center of another imagelet is equal to $$d\frac{\sqrt{3}}{3},$$

and
(ii) the longest distance between a center of one imagelet and a center of another imagelet is equal to d.

17. The method of claim 12, wherein:
(a) each of the light field images captures light that has passed through a different lenslet array in the set of lenslet arrays;
(b) the method further comprises calculating a combined digital image, by computationally combining the light field images;
(c) each lenslet in the lenslet arrays refracts light to form an imagelet that has a has a radius r; and
(d) in the combined image, imagelets overlap to form an overlapped pattern in which
(i) the shortest distance between a center of one imagelet and a center of another imagelet is equal to r, and
(ii) the longest distance between a center of one imagelet and a center of another imagelet is equal to r.

18. The method of claim 12, wherein:
(a) each of the light field images captures light that has passed through a different lenslet array in the set of lenslet arrays;
(b) the method further comprises calculating a combined digital image, by computationally combining the light field images;
(c) each lenslet in the lenslet arrays refracts light to form an imagelet that has a has a radius r; and
(d) in the combined image, imagelets overlap to form an overlapped pattern in which
(i) the shortest distance between a center of one imagelet and a center of another imagelet is equal to r, and
(ii) the longest distance between a center of one imagelet and a center of another imagelet is equal to $r\sqrt{2}$.

19. The method of claim 12, wherein:
(a) each of the light field images captures light that has passed through a different lenslet array in the set of lenslet arrays;
(b) the method further comprises calculating a combined digital image, by computationally combining the light field images.
(c) each lenslet in the lenslet arrays refracts light to form an imagelet that has a has a radius r; and (d) in the combined image, imagelets overlap to form an overlapped pattern in which
  (i) the shortest distance between a center of one imagelet and a center of another imagelet is equal to $$r\frac{\sqrt{2}}{2},$$

and
  (ii) the longest distance between a center of one imagelet and a center of another imagelet is equal to r.

20. The method of claim 12, wherein:
(a) each of the light field images captures light that has passed through a different lenslet array in the set of lenslet arrays;
(b) the method further comprises calculating a combined digital image, by computationally combining the light field images;
(c) each lenslet in the lenslet arrays refracts light to form an imagelet that has a has a radius r; and
(d) in the combined image, imagelets overlap to form an overlapped pattern in which
  (i) the shortest distance between a center of one imagelet and a center of another imagelet is equal to $$r\frac{\sqrt{3}}{3},$$

and
  (ii) the longest distance between a center of one imagelet and a center of another imagelet is equal to r.

* * * * *

UNITED STATES PATENT AND TRADEMARK OFFICE
CERTIFICATE OF CORRECTION

PATENT NO. : 10,520,715 B2
APPLICATION NO. : 16/155874
DATED : December 31, 2019
INVENTOR(S) : Ben Ezra et al.

Page 1 of 1

It is certified that error appears in the above-identified patent and that said Letters Patent is hereby corrected as shown below:

In the Specification

In Column 1, Line 8, after paragraph "RELATED APPLICATIONS" insert heading & paragraph:
--GOVERNMENT SUPPORT
This invention was made with government support under R01 MH103910 and U01 NS090438 awarded by the National Institutes of Health. The government has certain rights in the invention.--

Signed and Sealed this
Ninth Day of December, 2025

John A. Squires
*Director of the United States Patent and Trademark Office*